United States Patent
Han et al.

(10) Patent No.: US 10,419,096 B2
(45) Date of Patent: Sep. 17, 2019

(54) METHOD AND DEVICE FOR TRANSMITTING CONTROL INFORMATION IN WIRELESS COMMUNICATION SYSTEM

(71) Applicant: LG ELECTRONICS INC., Seoul (KR)

(72) Inventors: Seunghee Han, Anyang-si (KR); Jaehoon Chung, Anyang-si (KR); Hyunwoo Lee, Anyang-si (KR); Moonil Lee, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/894,621

(22) Filed: Feb. 12, 2018

(65) Prior Publication Data

US 2018/0167125 A1    Jun. 14, 2018

Related U.S. Application Data

(63) Continuation of application No. 14/956,588, filed on Dec. 2, 2015, now Pat. No. 9,893,792, which is a (Continued)

(30) Foreign Application Priority Data

Jul. 19, 2011    (KR) .......................... 10-2011-0071457

(51) Int. Cl.
*H04W 4/00* (2018.01)
*H04B 7/06* (2006.01)
(Continued)

(52) U.S. Cl.
CPC ......... *H04B 7/0626* (2013.01); *H04B 7/0632* (2013.01); *H04L 1/0026* (2013.01); (Continued)

(58) Field of Classification Search
None
See application file for complete search history.

(56) References Cited

U.S. PATENT DOCUMENTS

| 5,717,858 A | 2/1998 | Shtayer et al. .............. 709/224 |
| 6,041,235 A | 3/2000 | Aalto ........................... 455/437 |

(Continued)

FOREIGN PATENT DOCUMENTS

| CN | 101578771 A | 11/2009 |
| CN | 101656559 A | 2/2010 |

(Continued)

OTHER PUBLICATIONS

3GPP TS 36.213 V9.2.0 (Jun. 2010) Technical Specification; 3rd Generation Partnership Project; Technical Specification Group Radio Access Network; Evolved Universal Terrestrial Radio Access (E-UTRA); Physical layer procedures (Release 9).

(Continued)

*Primary Examiner* — Zewdu A Beyen
(74) *Attorney, Agent, or Firm* — Dentons US LLP

(57) ABSTRACT

The present invention relates to a wireless communication system. More specifically, the present invention relates to a method and a device for reporting CSI in a wireless communication system, the method comprising: a step for configuring a plurality of serving cells; and a step for reporting the CSI of only one serving cell in a corresponding subframe, wherein the step for reporting the CSI of only one serving cell comprises: excluding reporting the CSI of a lower priority when CSI reports of the plurality of serving cells in the corresponding subframe collide; and excluding reporting the CSI of serving cells other than the serving cell having the smallest index when the CSI reports of different serving cells having the same priority in the corresponding subframe collide.

15 Claims, 33 Drawing Sheets

Related U.S. Application Data continuation of application No. 13/809,568, filed as application No. PCT/KR2011/005296 on Jul. 19, 2011, now Pat. No. 9,237,580.

(60) Provisional application No. 61/365,358, filed on Jul. 19, 2010, provisional application No. 61/366,164, filed on Jul. 21, 2010.

(51) Int. Cl.

| | | |
|---|---|---|
| *H04L 1/00* | (2006.01) | |
| *H04L 5/00* | (2006.01) | |
| *H04L 27/26* | (2006.01) | |
| *H04L 1/16* | (2006.01) | |
| *H04W 72/10* | (2009.01) | |
| *H04L 1/18* | (2006.01) | |
| *H04W 24/02* | (2009.01) | |
| *H04W 24/10* | (2009.01) | |
| *H04W 28/06* | (2009.01) | |

(52) U.S. Cl.
CPC .......... *H04L 1/0029* (2013.01); *H04L 1/0031* (2013.01); *H04L 1/1671* (2013.01); *H04L 5/0041* (2013.01); *H04L 5/0055* (2013.01); *H04L 5/0057* (2013.01); *H04L 27/2633* (2013.01); *H04L 27/2636* (2013.01); *H04W 72/10* (2013.01); *H04L 1/1812* (2013.01); *H04L 5/001* (2013.01); *H04W 24/02* (2013.01); *H04W 24/10* (2013.01); *H04W 28/06* (2013.01)

(56) References Cited

U.S. PATENT DOCUMENTS

| | | | | |
|---|---|---|---|---|
| 8,520,491 | B2 * | 8/2013 | Lunttila .................. | H04L 5/001 370/203 |
| 8,976,751 | B2 | 3/2015 | Yang et al. .................... | 370/329 |
| 2002/0032032 | A1 | 3/2002 | Haumont et al. ............. | 455/436 |
| 2009/0181676 | A1 | 7/2009 | Lee et al. ........................ | 455/436 |
| 2009/0296643 | A1 | 12/2009 | Cave et al. .................... | 370/329 |
| 2010/0035611 | A1 | 2/2010 | Montojo et al. | |
| 2010/0081438 | A1 | 4/2010 | Callender et al. ............. | 455/436 |
| 2010/0322173 | A1 | 12/2010 | Marinier et al. ............... | 370/329 |
| 2011/0007674 | A1 | 1/2011 | Dai et al. ........................ | 370/282 |
| 2011/0249578 | A1 | 10/2011 | Nayeb Nazar ........ | H04L 1/0027 370/252 |

FOREIGN PATENT DOCUMENTS

| | | |
|---|---|---|
| CN | 101695016 A | 4/2010 |
| CN | 101697635 A | 4/2010 |
| EP | 2553858 A1 | 2/2013 |
| JP | 2008-301253 | 12/2008 |
| KR | 10-2009-0075750 | 7/2009 |
| KR | 10-2009-0094743 A | 9/2009 |
| KR | 10-2010-0002114 A | 1/2010 |
| KR | 10-2010-0019946 | 2/2010 |
| KR | 10-2010-0058399 | 6/2010 |
| WO | 2011121063 A1 | 10/2011 |
| WO | 2012077480 A1 | 6/2012 |
| WO | 20123077480 A1 | 6/2012 |

OTHER PUBLICATIONS

Motorola mobility: "Periodic CQI/PMI/RI reporting for CA", 3GPP DRAFT, R1-110296_PUCCH_FOR_CA_FINAL, 3rd Generation Partnership Project (3GPP), Mobile Competence Centre; 650, Route Des Lucioles; F-06921 Sophia-Antipolis Cedex; France, vol. RAN WG1, no. Dublin, Ireland; Jan. 17, 2011, Jan. 13, 2011, XP050490373.
Panasonic: "Periodic CQI reporting for carrier aggregation", 3GPP DRAFT, R1-103749, 3rd Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010, Jun. 22, 2010, XP050449179.
Panasonic: "Periodic CQI Reporting for Carrier Aggregation", 3GPP TSG-RAN WG1 Meeting 61, R1-102861, May 10-14, 2010.
Huawei: "UCI on PUSCH for carrier aggregation", 3GPP TSG RAN WG1 Meeting #61 bis, R1-103890, Jun. 28-Jul. 2, 2010.

* cited by examiner

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | | | | | | |
| 2 | 1 | n'=0 | | 12 | n'=0 | | 12 |
| 3 | 2 | | 6 | | | 6 | |
| 4 | 3 | 1 | | 13 | 1 | | 13 |
| 5 | 4 | | 7 | | | 7 | |
| 6 | 5 | 2 | | 14 | 2 | | 14 |
| 7 | 6 | | 8 | | | 8 | |
| 8 | 7 | 3 | | 15 | 3 | | 15 |
| 9 | 8 | | 9 | | | 9 | |
| 10 | 9 | 4 | | 16 | 4 | | 16 |
| 11 | 10 | | 10 | | | 10 | |
| 0 | 11 | 5 | | 17 | 5 | | 17 |
| | | | 11 | | | 11 | |

$\Delta_{shift}^{PUCCH} \in \{1,2,3\}$ for normal cyclic prefix
$\Delta_{shift}^{PUCCH} \in \{1,2,3\}$ for extended cyclic prefix $\delta_{offset}^{PUCCH} \in \{0,1,...,\Delta_{shift}^{PUCCH} -1\}$ Cell specific cyclic shift offset Cell-specific Cyclic shift value of CAZAC sequence $n_{OC}$    Orthogonal sequence index for ACK/NACK
$\bar{n}_{OC}$    Orthogonal sequence index for RS
$n_{CS}$    Cyclic shift value of a CAZAC sequence
n'    ACK/NACK resource index used for the channelization in a RB Reuse of LTE PUCCH format 2 structure (normal CP case)

Reuse of LTE PUCCH format 2 structure (extended CP case)

FIG. 30

CQI/PMI/RI feedback type for PUCCH reporting modes

|  |  | PMI feedback type | |
|---|---|---|---|
|  |  | No PMI (OL, TD, single-antenna) | Single PMI (CL) |
| CQI feedback type | Wideband | Mode 1-0<br>RI (only for Open-loop SM)<br><br>One wideband CQI (4 bits)<br><br>When RI > 1,<br>CQI of first codeword | Mode 1-1<br>RI<br><br>Wideband CQI (4 bits)<br><br>Wideband spatial CQI (3 bits)<br>for RI > 1<br><br>Wideband PMI (4 bits) |
|  | UE selected | Mode 2-0<br>RI (only for open-loop SM)<br><br>Wideband CQI (4 bits)<br><br>Best-1 CQI (4 bits) in each BP<br>Best-1 indicator (L-bit label)<br><br>When RI > 1,<br>CQI of first codeword | Mode 2-1<br>RI<br><br>Wideband CQI (4 bits)<br><br>Wideband spatial CQI<br>(3 bits) for RI > 1<br>Wideband PMI (4 bits)<br><br>Best-1 CQI (4 bits) in each BP<br>Best-1 spatial CQI<br>(3 bits) for RI > 1<br><br>Best-1 indicator (L-bit label) |

Type 1: CQI feedback for UE-selected subband(s)
Type 2: Wideband CQI feedback and wideband PMI feedback
Type 3: RI feedback
Type 4: Wideband CQI feedback } Report type

FIG. 31

☐ Wideband spatial differential CQI for codeword 2 (RI > 1)
  ⌵ Wideband CQI index for codeword 1 − wideband CQI index for codeword 2
  ⌵ The set of offset levels is {-4, -3, -2, -1, 0, 1, 2, 3} : 3 bits
☐ Subband size and BP for UE-selected case

| System band $N_{RB}^{DL}$ | Subband size k [RPs] | Bandwidth part (J) |
|---|---|---|
| 6-7 | (Widewband CQI only) | 1 |
| 8-10 | 4 | 1 |
| 11-26 | 4 | 2 |
| 27-63 | 6 | 3 |
| 64-110 | 8 | 4 |

Subband size and bandwidth parts vs DL system bandwidth

METHOD AND DEVICE FOR TRANSMITTING CONTROL INFORMATION IN WIRELESS COMMUNICATION SYSTEM

This application is a continuation of U.S. patent application Ser. No. 14/956,588, filed Dec. 2, 2015, now allowed, which is a continuation of U.S. patent application Ser. No. 13/809,568, filed Jan. 10, 2013, now U.S. Pat. No. 9,237,580, which is a National Stage Application of International Application No. PCT/KR2011/005296, filed Jul. 19, 2011, which claims the benefit of U.S. Provisional Application No. 61/365,358, filed Jul. 19, 2010, U.S. Provisional Application No. 61/366,164, filed Jul. 21, 2010, which claims the priority of Korean Patent Application No. 10-2011-0071457 filed Jul. 19, 2011, all of which are incorporated by reference in their entirety herein.

TECHNICAL FIELD

The present invention relates to a wireless communication system, and more particularly to a method and apparatus for transmitting control information in a wireless communication system supporting carrier aggregation (CA).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for efficiently transmitting control information in a wireless communication system that substantially obviate one or more problems due to limitations and disadvantages of the related art. An object of the present invention is to provide a method and apparatus for efficiently transmitting control information in a wireless communication system. Another object of the present invention is to provide a channel format and signal processing for effectively transmitting control information, and an apparatus for the channel format and the signal processing. A further object of the present invention is to provide a method and apparatus for effectively allocating resources for transmitting control information.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for performing a channel state information (CSI) report in a wireless communication system, the method comprising: configuring a plurality of serving cells; and performing a CSI report of only a single serving cell in a corresponding subframe, wherein the performing of the CSI report of only the single serving cell includes: if CSI reports of a plurality of serving cells collide with each other in the corresponding subframe, dropping one or more CSI reports having lower priorities, and if CSI reports of different serving cells having a same priority collide with each other in the corresponding subframe, dropping CSI reports of one or more serving cells other than one serving cell having the lowest index.

In another aspect of the present invention, a communication device for performing a channel state information (CSI) report in a wireless communication system includes: a radio frequency (RF) unit; and a processor, wherein the processor configures a plurality of serving cells, and performs a CSI report of only a single serving cell in a corresponding subframe, wherein the performing of the CSI report of only the single serving cell includes: if CSI reports of a plurality of serving cells collide with each other in the corresponding subframe, dropping one or more CSI reports having lower priorities, and if CSI reports of different serving cells having a same priority collide with each other in the corresponding subframe, dropping CSI reports of one or more serving cells other than one serving cell having the lowest index.

The method may further include: if CSI reports of different serving cells having the same priority collide with each other in the corresponding subframe, transmitting a CSI report of the serving cell having the lowest index.

The priority of the CSI report may be determined according to a physical uplink control channel (PUCCH) report type.

The CSI report may include at least one of a channel quality indicator (CQI), a precoding matrix indicator (PMI) and a Rank indicator (RI), and a first period and a first offset for the CQI/PMI, and a second period and a second offset for the RI may be given per serving cell.

The plurality of serving cells may include a primary cell (PCell) and a secondary cell (SCell).

The CSI report may be transmitted using a PUCCH format 1b.

Advantageous Effects

Exemplary embodiments of the present invention have the following effects. Control information can be effectively transmitted in a wireless system. In addition, the embodiments of the present invention can provide a channel format and a signal processing method to effectively transmit control information. In addition, resources for transmitting control information can be effectively assigned.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 17 is a diagram showing ACK/NACK channelization of PUCCH formats 1a and 1b.

FIGS. 30 to 32 are conceptual diagrams illustrating a periodic channel state information (CSI) report procedure of the legacy LTE.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
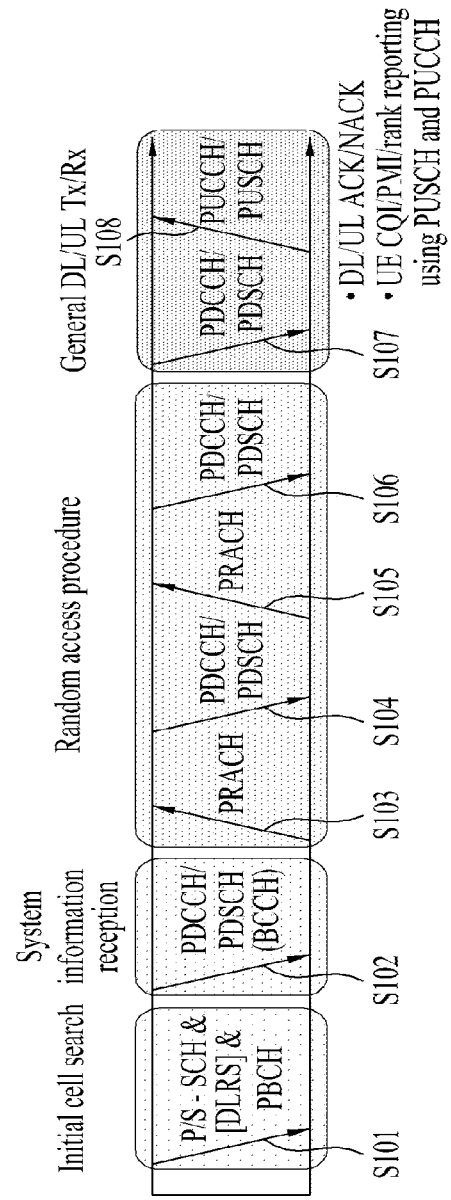
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS.

Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access CHannel (PRACH) in step S103 and receive a response message for the random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
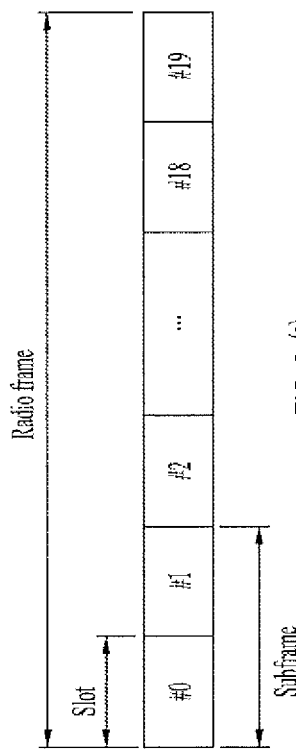
FIG. 2A is a diagram illustrating a structure of a radio frame.
FIG. 2B is a diagram illustrating a structure of a radio frame.
Figure 2:
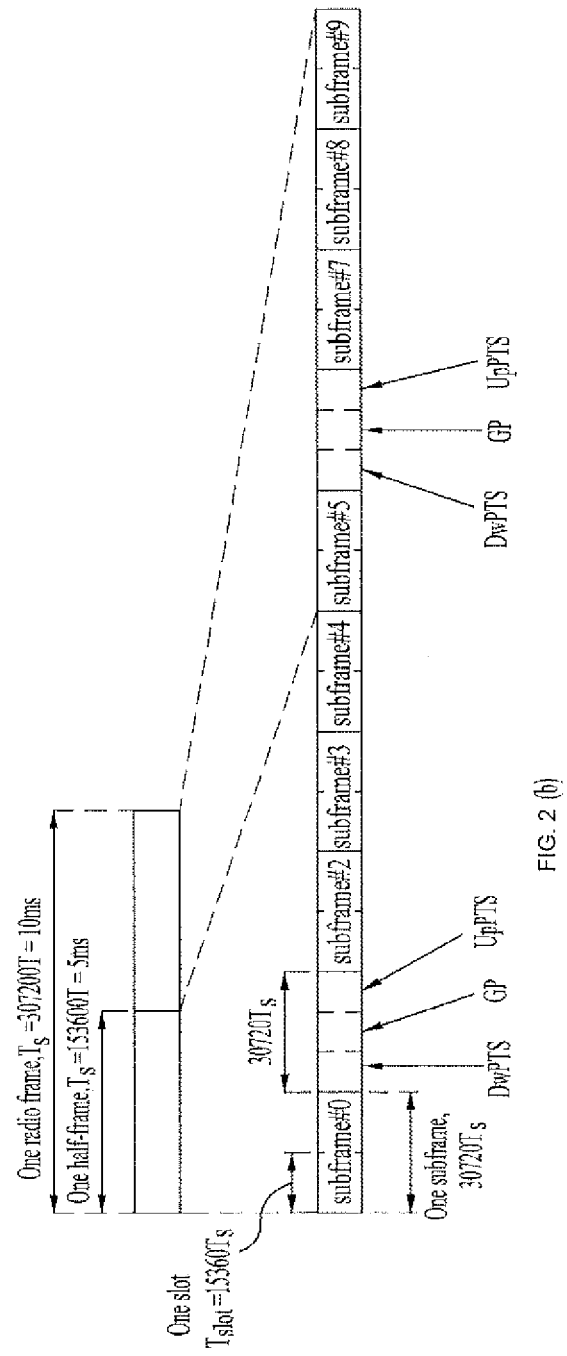

FIG. 2 illustrates a radio frame structure. In a cellular OFDM wireless packet communication system, UL/DL data packet transmission is performed based on subframe. One subframe is defined as a predetermined interval including a plurality of OFDM symbols. 3GPP LTE supports a type-1 radio frame applicable to Frequency Division Duplex (FDD) and type-2 radio frame applicable to Time Division Duplex (TDD).

FIG. 2(a) illustrates a type-1 radio frame structure. A DL radio frame includes 10 subframes each having 2 slots in the time domain. A time required to transmit one subframe is referred to as Transmission Time Interval (TTI). For example, one subframe is 1 ms long and one slot is 0.5 ms long. One slot includes a plurality of OFDM symbols in the time domain and a plurality of Resource Blocks (RBs) in the frequency domain. Since 3GPP LTE systems use OFDMA in downlink, an OFDM symbol represents one symbol interval. The OFDM symbol can be called an SC-FDMA symbol or symbol interval. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The aforementioned structure of the radio frame is only exemplary, and various modifications can be made to the number of subframes contained in the radio frame or the number of slots contained in each subframe, or the number of OFDM symbols in each slot.

Figure 3A:
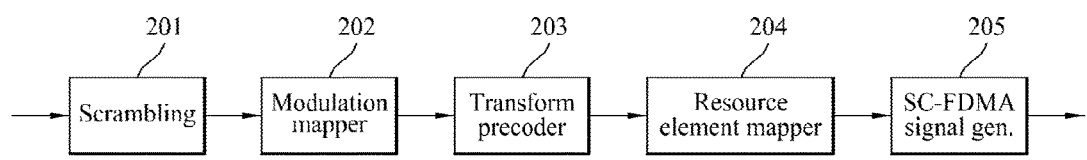
FIG. 3A is a conceptual diagram illustrating a method for processing an uplink signal.

FIG. 3A is a conceptual diagram illustrating a signal processing method for transmitting an uplink signal by a user equipment (UE).

Referring to FIG. 3A, the scrambling module 201 may scramble a transmission signal in order to transmit the uplink signal. The scrambled signal is input to the modulation mapper 202, such that the modulation mapper 202 modulates the scrambled signal to complex symbols in Binary Phase Shift Keying (BPSK), Quadrature Phase Shift Keying (QPSK), or 16-ary Quadrature Amplitude Modulation (16QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the BS through an antenna after being processed in a Single Carrier-Frequency Division Multiple Access (SC-FDMA) signal generator 205.

Figure 3B:
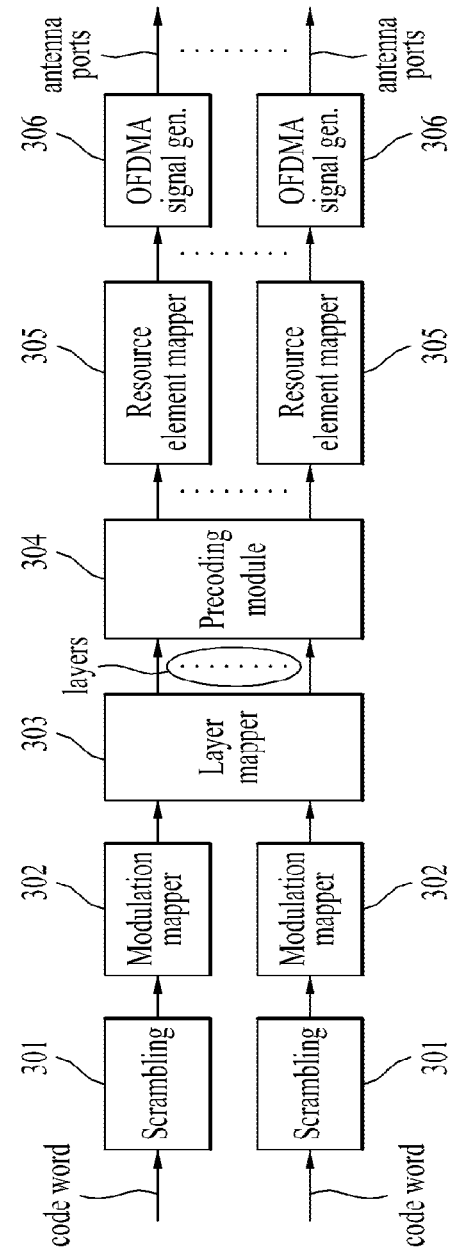
FIG. 3B is a conceptual diagram illustrating a method for processing a downlink signal.

FIG. 3B is a conceptual diagram illustrating a signal processing method for transmitting a downlink signal by a base station (BS).

Referring to FIG. 3B, the BS can transmit one or more codewords via a downlink in a 3GPP LTE system. Codewords may be processed as complex symbols by the scrambling module 301 and the modulation mapper 302 in the same manner as in the uplink operation shown in FIG. 3A. Thereafter, the complex symbols are mapped to a plurality of layers by the layer mapper 303, and each layer is multiplied by a predetermined precoding matrix and is then allocated to each transmission antenna by the precoder 304. The processed transmission signals of individual antennas are mapped to time-frequency resource elements (REs) to be used for data transmission by the RE mapper 305. Thereafter, the mapped result may be transmitted via each antenna after passing through the OFDMA signal generator 306.

In the case where a UE for use in a wireless communication system transmits an uplink signal, a Peak to Average Power Ratio (PAPR) may become more serious than in the case where the BS transmits a downlink signal. Thus, as described in FIGS. 3A and 3B, the SC-FDMA scheme is used for uplink signal transmission in a different way from the OFDMA scheme used for downlink signal transmission.

Figure 4:
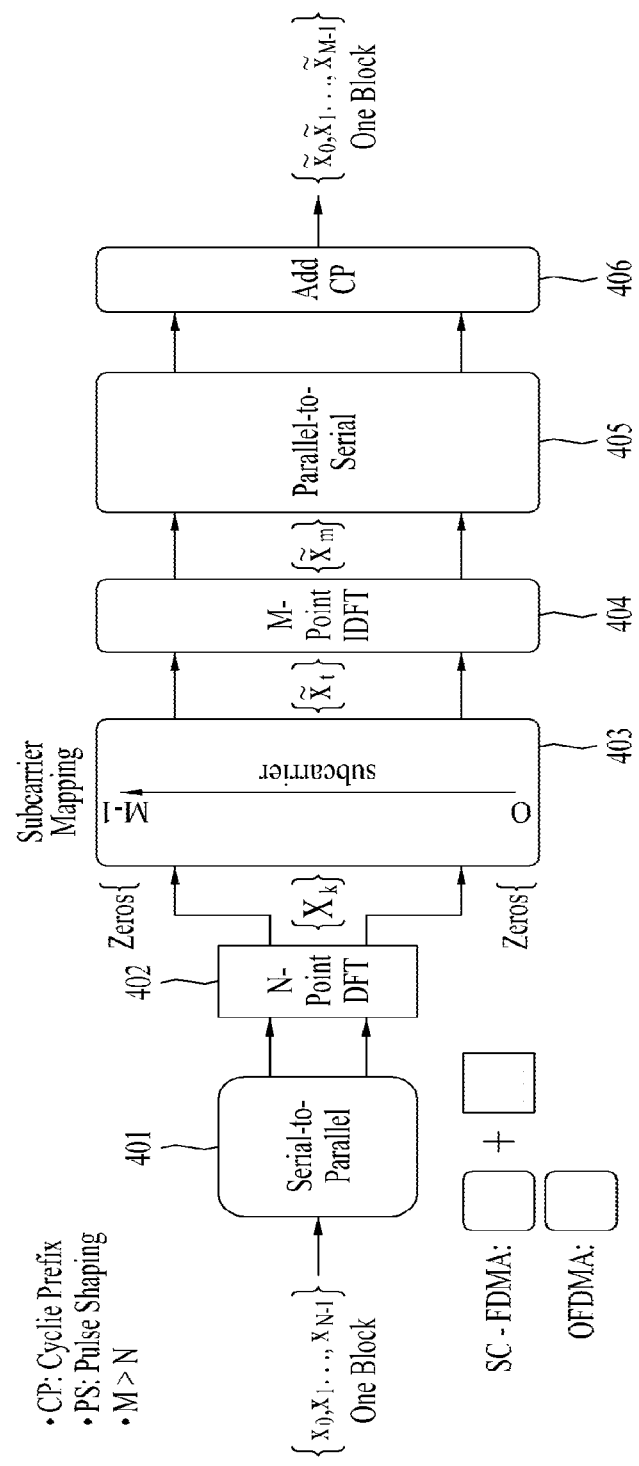
FIG. 4 is a conceptual diagram illustrating an SC-FDMA scheme and an OFDMA scheme applicable to embodiments of the present invention.

FIG. 4 is a conceptual diagram illustrating an SC-FDMA scheme and an OFDMA scheme applicable to embodiments of the present invention. In the 3GPP system, the OFDMA scheme is used in downlink and the SC-FDMA scheme is used in uplink.

Referring to FIG. 4, not only a UE for uplink signal transmission but also a BS for downlink signal transmission includes a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402, and compensates for a predetermined part of the IDFT processing influence of the M-point IDFT module 1504 so that a transmission signal can have single carrier characteristics (i.e., single-carrier properties).

Figure 5A:
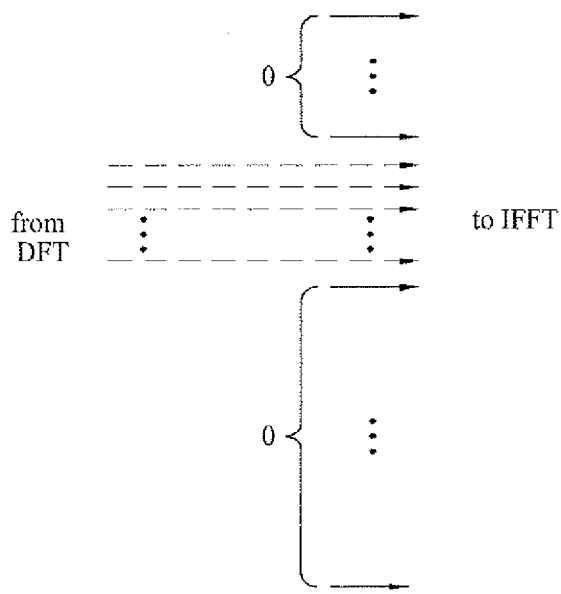
FIG. 5A is a conceptual diagram illustrating a signal mapping scheme in a frequency domain so as to satisfy single carrier characteristics.
Figure 5B:
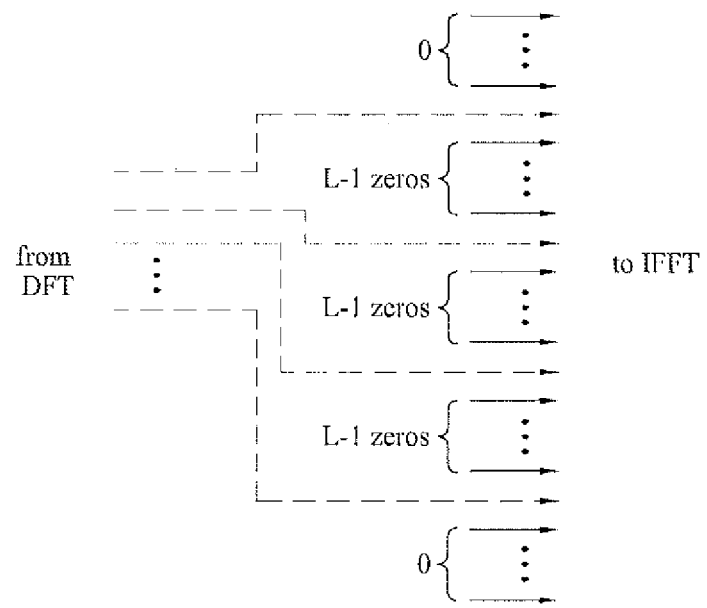
FIG. 5B is a conceptual diagram illustrating a signal mapping scheme in a frequency domain so as to satisfy single carrier characteristics.

FIG. 5 illustrates a signal mapping scheme in the frequency domain for satisfying the single carrier properties. FIG. 5 (a) shows a localized mapping scheme and FIG. 5 (b) shows a distributed mapping scheme.

A clustered SC-FDMA scheme which is a modified form of the SC-FDMA scheme is described as follows. In the clustered SC-FDMA scheme, DFT process output samples are divided into sub-groups in a subcarrier mapping procedure and are non-contiguously mapped in the frequency domain (or subcarrier domain)

Figure 6:
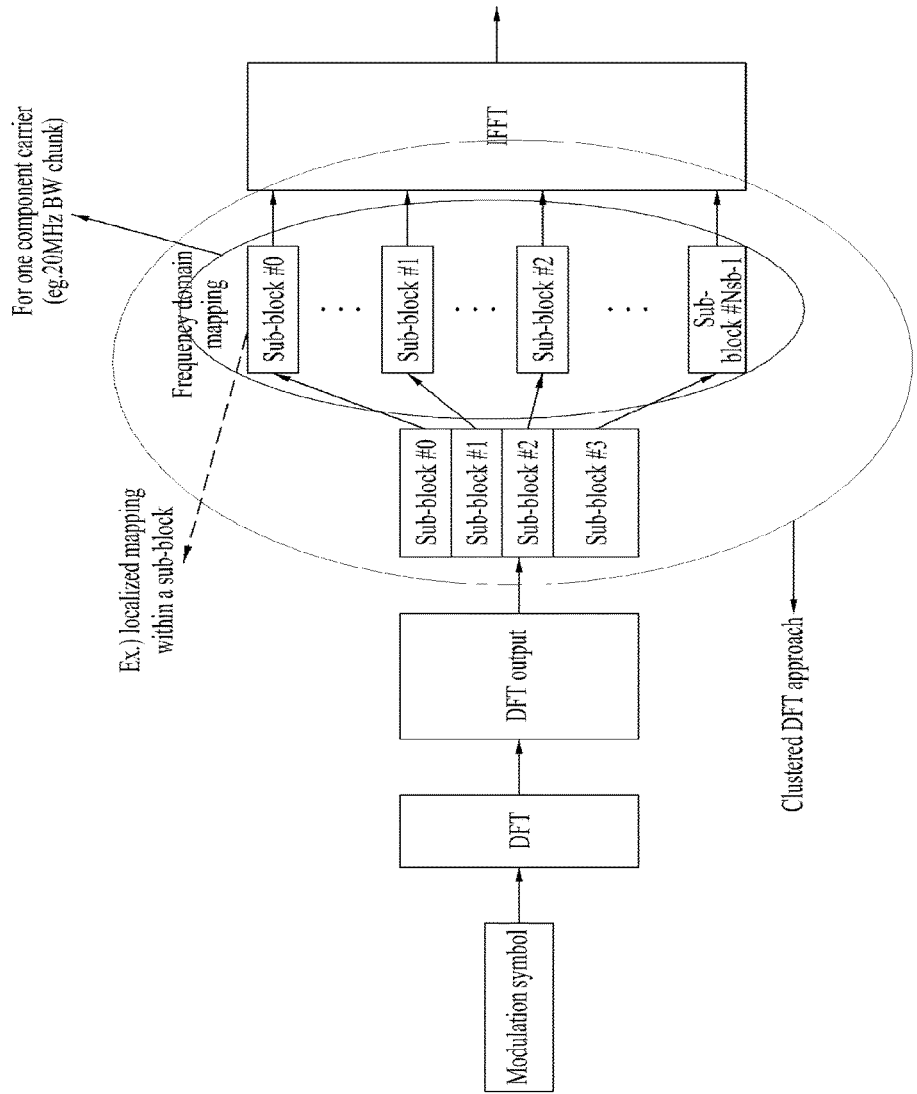
FIG. 6 is a conceptual diagram illustrating the signal processing for mapping DFT process output samples to a single carrier in a clustered SC-FDMA.
Figure 7:
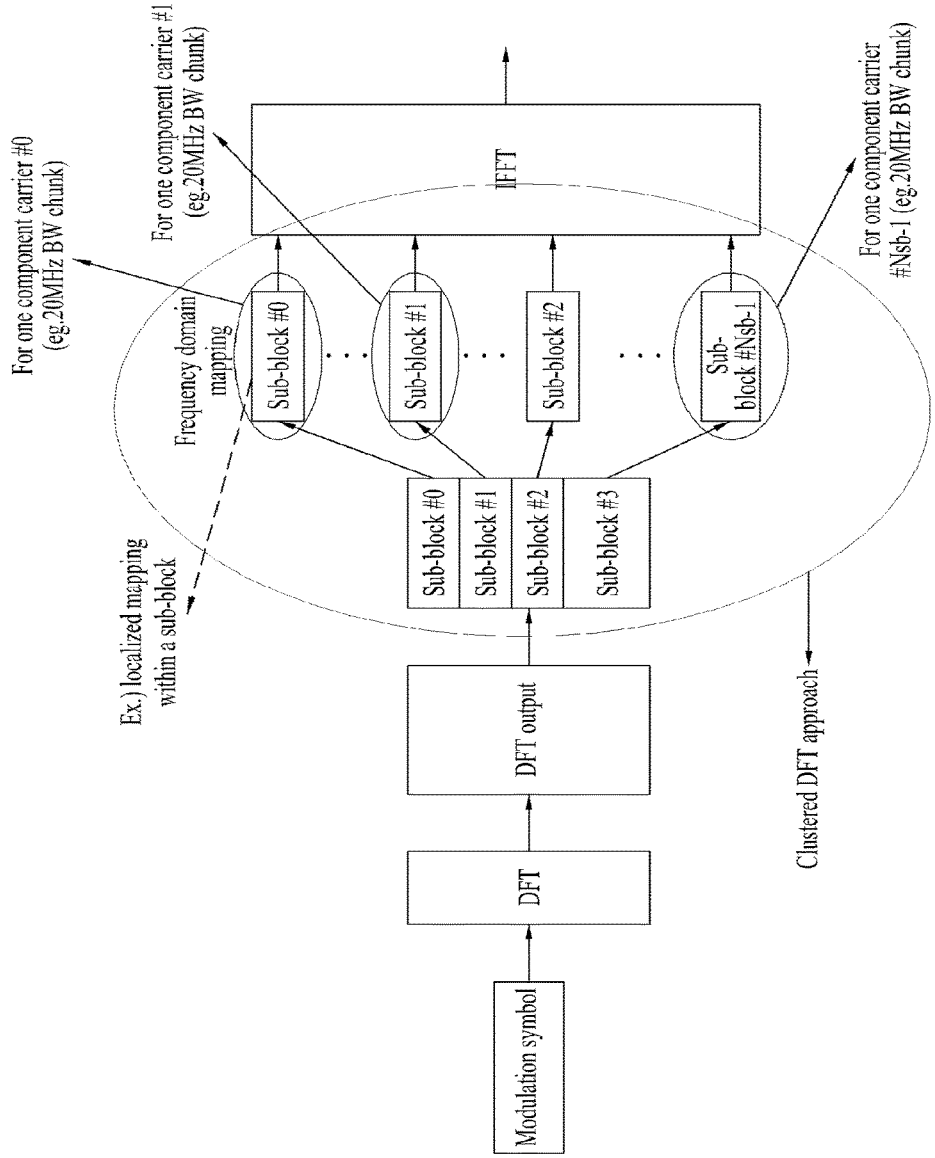
FIGS. 7 and 8 show the signal processing in which DFT process output samples are mapped to multiple carriers in a clustered SC-FDMA.
Figure 8:
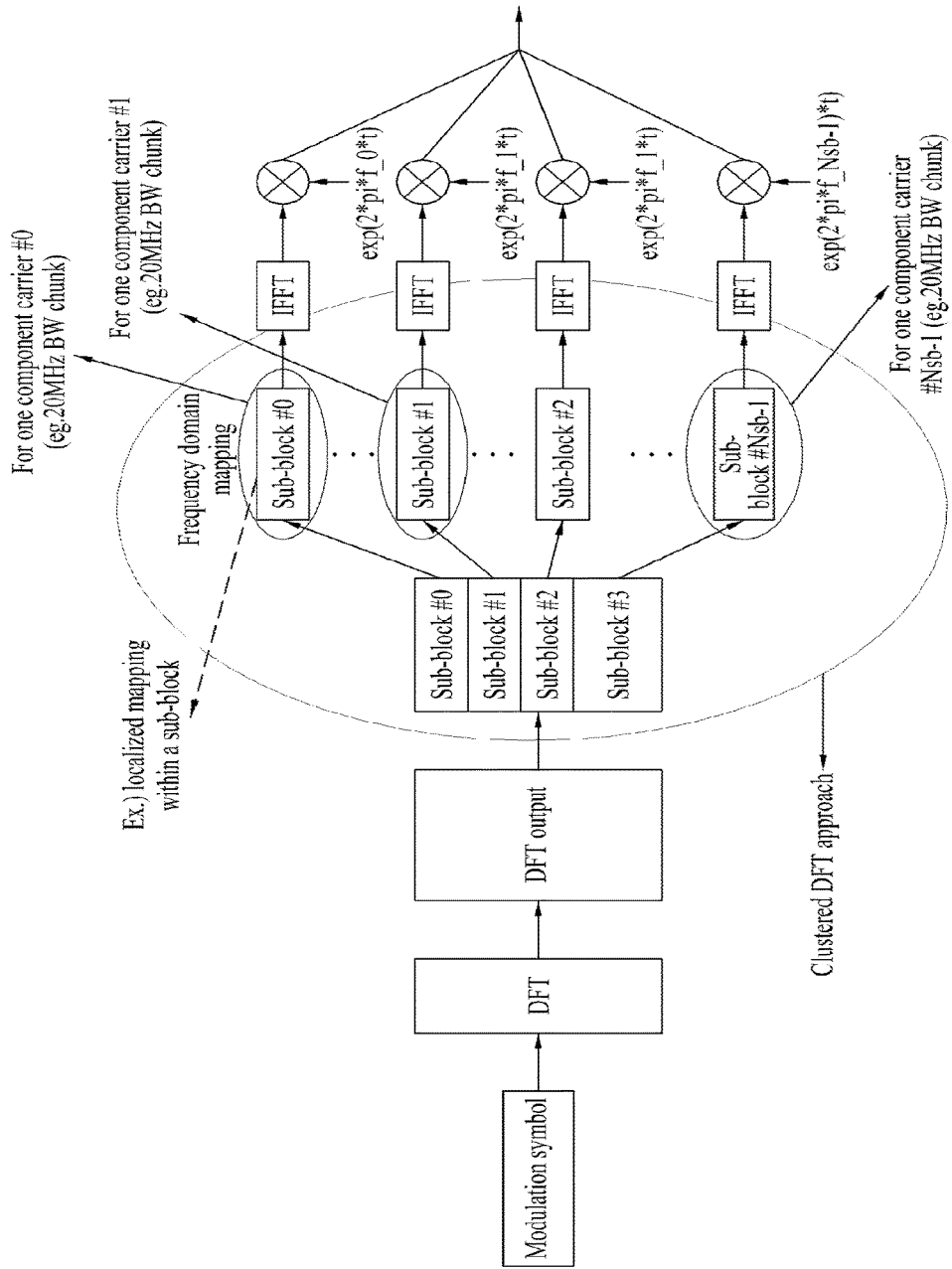

FIG. 6 shows signal processing in which DFT-process output samples are mapped to one carrier in the clustered SC-FDMA. FIGS. 7 and 8 show signal processing in which DFT process output samples are mapped to multicarriers in a clustered SC-FDMA. FIG. 6 shows the example of intra-carrier cluster SC-FDMA application. FIGS. 7 and 8 show examples of the inter-carrier clustered SC-FDMA application. FIG. 7 shows the example in which a signal is generated through a single IFFT block under the condition that component carriers are contiguously allocated to a frequency domain and the subcarrier spacing between contiguous component carriers is arranged. FIG. 8 shows another example in which a signal is generated through several IFFT blocks under the condition that component carriers are non-contiguously allocated to a frequency domain.

Figure 9:
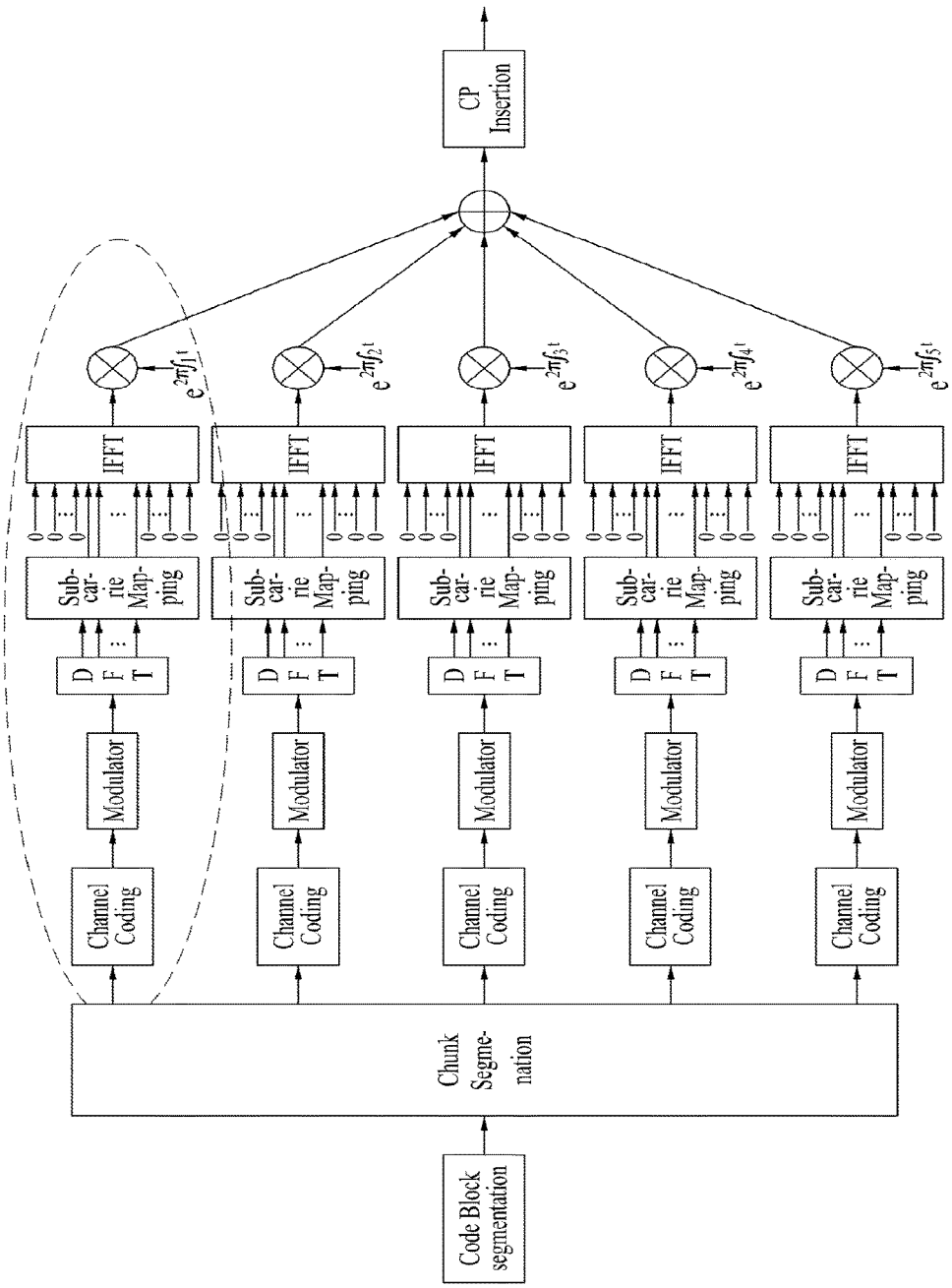
FIG. 9 shows exemplary segmented SC-FDMA signal processing.

FIG. 9 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by NxSC-FDMA or NxDFT-s-OFDMA. For convenience of description and better understanding of the present invention, the segmented SC-FDMA, NxSC-FDMA and NxDFT-s-OFDMA may be generically referred to as 'segment SC-FDMA'. Referring to FIG. 9, in order to reduce single carrier characteristics, the segment SC-FDMA groups all the time domain modulation symbols into N groups, such that a DFT process is performed in units of a group.

Figure 10:
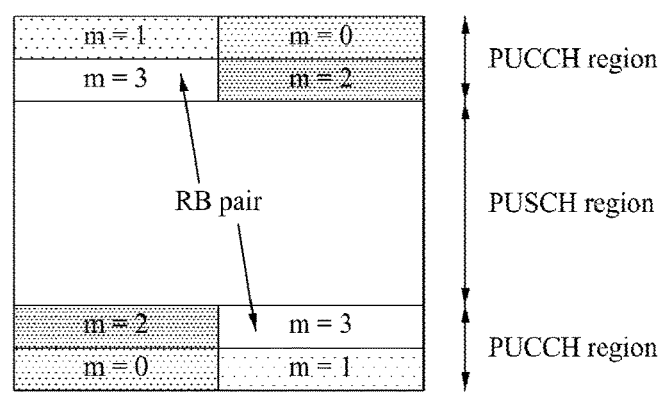
FIG. 10 shows an uplink subframe structure.

FIG. 10 shows an uplink subframe structure.

As shown in FIG. 10, the UL subframe includes a plurality of slots (e.g., two slots). Each slot may include a plurality of SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes a pair of RBs (e.g., m=0, 1, 2, 3) located at both ends of the data region on the frequency axis (specifically, a pair of RBs at frequency mirrored locations) and hops between slots. The UL control information (i.e., UCI) includes HARQ ACK/NACK, Channel Quality Information (CQI), Precoding Matrix Indicator (PMI), and Rank Indication (RI).

Figure 11:
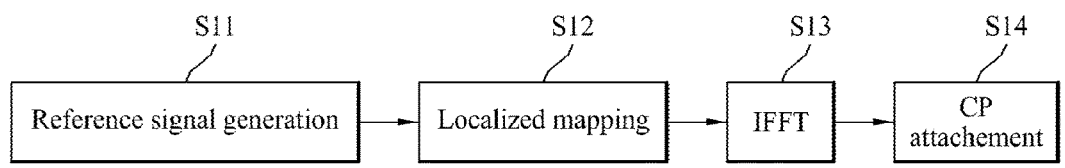
FIG. 11 is a conceptual diagram illustrating a signal processing procedure for transmitting a reference signal (RS) on uplink.

FIG. 11 illustrates a signal processing procedure for transmitting a Reference Signal (RS) in the uplink. As shown in FIG. 11, data is transformed into a frequency domain signal by a DFT precoder and the signal is then transmitted after being subjected to frequency mapping and IFFT. On the other hand, an RS does not pass through the DFT precoder. More specifically, an RS sequence is directly generated in the frequency domain (S11) and is then transmitted after being sequentially subjected to a localized-mapping process (S12), an IFFT process (S13), and a CP attachment process (S14).

The RS sequence $r_{u,v}^{(\alpha)}(n)$ is defined by a cyclic shift $\alpha$ of a base sequence and may be expressed by the following equation 1.

$$r_{u,v}^{(\alpha)}(n)=e^{j\alpha n}\bar{r}_{u,v}(n), 0 \leq n < M_{sc}^{RS}, \quad \text{[Equation 1]}$$

where $M_{sc}^{RS}=mN_{sc}^{RB}$ denotes the length of the RS sequence, $N_{sc}^{RB}$ denotes the size of a resource block represented in subcarriers, and m is $1 \leq m \leq N_{RB}^{max,UL}$. $N_{RB}^{max,UL}$ denotes a maximum UL transmission band.

A base sequence $\bar{r}_{u,v}(n)$ is divided into several groups. $u \in \{0, 1, \ldots, 29\}$ denotes group number, and v corresponds to a base sequence number in a corresponding group. Each group includes one base sequence v=0 having a length of $M_{sc}^{RS}=mN_{sc}^{RB}$ ($1 \leq m \leq 5$) and two base sequences v=0,1 having a length of $M_{sc}^{RS}=mN_{sc}^{RB}$ ($6 \leq m \leq N_{RB}^{max,UL}$). The sequence group number u and the number v within a corresponding group may be changed with time. The base sequence $\bar{r}_{u,v}(0), \ldots, \bar{r}_{u,v}(M_{sc}^{RS}-1)$ is defined based on a sequence length $M_{sc}^{RS}$.

The base sequence having a length of $3N_{sc}^{RB}$ or more may be defined as follows.

With respect to $M_{sc}^{RS} \geq 3N_{sc}^{RB}$, the base sequence $\bar{r}_{u,v}(0), \ldots, \bar{r}_{u,v}(M_{sc}^{RS}-1)$ is given by the following equation 2.

$$\bar{r}_{u,v}(n)=x_q(n \bmod N_{ZC}^{RS}), 0 \leq n < M_{sc}^{RS}, \quad \text{[Equation 2]}$$

where a q-th root Zadoff-Chu sequence may be defined by the following equation 3.

$$x_q(m) = e^{-j\frac{\pi qm(m+1)}{N_{ZC}^{RS}}}, 0 \leq m \leq N_{ZC}^{RS} - 1, \quad \text{[Equation 3]}$$

where q satisfies the following equation 4.

$$q=\lfloor \bar{q}+1/2 \rfloor + v \cdot (-1)^{\lfloor 2\bar{q} \rfloor}$$

$$\bar{q}=N_{ZC}^{RS} \cdot (u+1)/31 \quad \text{[Equation 4]}$$

where the length $N_{ZC}^{RS}$ of the Zadoff-Chu sequence is given by the largest prime number, thus satisfying $N_{ZC}^{RS} < M_{sc}^{RS}$.

A base sequence having a length of less than $3N_{sc}^{RB}$ may be defined as follows. First, for $M_{sc}^{RS}=N_{sc}^{RB}$ and $M_{sc}^{RS}=2N_{sc}^{RB}$, the base sequence is given as shown in Equation 5.

$$\bar{r}_{u,v}(n)=e^{j\varphi(n)\pi/4}, 0 \leq n \leq M_{sc}^{RS}-1 \quad \text{[Equation 5]}$$

where values $\varphi(n)$ for $M_{sc}^{RS}=N_{sc}^{RB}$ and $M_{sc}^{RS}=2N_{sc}^{RB}$ are given by the following Table 1, respectively.

TABLE 1

| u | $\varphi(0), \ldots, \varphi(11)$ |
|---|---|
| 0  | -1  1  3 -3  3  3  1  1  3  1 -3  3 |
| 1  |  1  1  3  3  3 -1  1 -3 -3  1 -3  3 |
| 2  |  1  1 -3 -3 -3 -1 -3 -3  1 -3  1 -1 |
| 3  | -1  1  1  1  1 -1 -3 -3  1 -3  3 -1 |
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 | -1  3 -1  1  1 -3 -3 -1 -3 -3  3 -1 |
| 11 |  3  1 -1 -1  3  3 -3  1  3  1  3  3 |
| 12 |  1 -3  1  1 -3  1  1  1 -3 -3 -3  1 |
| 13 |  3  3 -3  3 -3  1  1  3 -1 -3  3  3 |
| 14 | -3  3  1 -1 -3 -3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1 -3  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

TABLE 2

| u | $\varphi(0), \ldots, \varphi(23)$ |
|---|---|
| 0  | -1  3  1 -3  3 -1  1  3 -3  3  1  3 -3  3  1  1 -1  1  3 -3  3 -3 -1 -3 |
| 1  | -3  3 -3 -3 -3  1 -3 -3  3 -1  1  1  1  3  1 -1  3 -3 -3  1  3  1  1 -3 |
| 2  |  3 -1  3  3  1  1 -3  3  3  3  3  1 -1  3 -1  1  1 -1 -3 -1 -1  1  3  3 |
| 3  | -1 -3  1  1  3 -3  1  1 -3 -1 -1  1  3  1  3  1 -1  3  1  1 -3 -1 -3 -1 |
| 4  | -1 -1 -1 -3 -3 -1  1  1  3  3 -1  3 -1  1 -3 -1 -1 -3  1 -3 -3 -1 -1 -1 |
| 5  | -3  1  1  3 -1  1  3  1 -3  1 -3  1  1 -1 -1  3 -1 -3  3 -3 -3 -3  1  1 |
| 6  |  1  1 -1 -1  3 -3 -3  3 -3  1 -1 -1  1 -1  1  1 -1 -3 -1  1 -1  3 -1 -3 |
| 7  | -3  3  3 -1 -1 -3 -1  3  1  3  1  3  1  1 -1  3  1 -1  1  3 -3 -1 -1  1 |
| 8  | -3  1  3 -3  1 -1 -3  3 -3  3 -1 -1 -1 -1  1 -3 -3 -3  1 -3 -3 -3  1 -3 |
| 9  |  1  1 -3  3  3 -1 -3 -1  3 -3  3  3  3 -1  1  1 -3  1 -1  1  1 -3  1  1 |
| 10 | -1  1 -3 -3  3 -1  3 -1 -1 -3 -3 -3 -1 -3 -3  1 -1  1  3  3 -1  1 -1  3 |
| 11 |  1  3  3 -3 -3  1  3  1 -3 -3 -3  3  3 -3  3  3 -1 -3  3 -1  1 -3  1  1 |
| 12 |  1  3  3  1  1  1 -1 -1  1 -3  3 -1  1  1 -3  3  3 -1 -3  3 -3 -1 -3 -1 |
| 13 |  3 -1 -1 -1 -1 -3 -1  3  3  1 -1  1  3  3  3 -1  1  1 -3  1  3 -1 -3  3 |
| 14 | -3 -3  3  1  3  1 -3  3  1  3  1  1  3  3 -1 -1 -3  1 -3 -1  3  1  1  3 |
| 15 | -1 -1  1 -3  1  3 -3  1 -1 -3 -1  3  1  3  1 -1 -3 -3 -1 -1 -3 -3 -3 -1 |
| 16 | -1 -3  3 -1 -1 -1 -1  1  1 -3  3  1  3  3  1 -1  1 -3  1 -3  1  1 -3 -1 |
| 17 |  1  3 -1  3  3 -1 -3  1 -1  3  3  3 -1  1  1 -3 -1 -1 -1  3 -1 -1 -1 -1 |
| 18 |  1  1  1  1  1 -1  3 -1 -3  1  1  3 -3  1 -3 -1  1  1 -3 -3  3  1  1 -3 |
| 19 |  1  3  3  1 -1 -3  3 -1  3  3  3 -3  1 -1  1 -1 -3 -1  1  3 -1  3 -3 -3 |
| 20 | -1 -3  3 -3 -3 -3 -1 -1 -3 -1 -3  3  1  3 -3 -1  3 -1  1 -1  3 -3  1 -1 |
| 21 | -3 -3  1  1 -1  1 -1  1 -1  3  1 -3 -1  1 -1  1 -1 -1  3  3 -3 -1  1 -3 |
| 22 | -3 -1 -3  3  1 -1 -3 -1 -3 -3  3 -3  3 -3 -1  1  3  1 -3  1  3  3 -1 -3 |
| 23 | -1 -1 -1 -1  3  3  3  1  3  3 -3  1  3 -1  3 -1  3  3 -3  3  1 -1  3  3 |
| 24 |  1 -1  3  3 -1 -3  3 -3 -1 -1  3 -1  3 -1 -1  1  1  1  1 -1 -1 -3 -1  3 |
| 25 |  1 -1  1 -1  3 -1  3  1  1 -1 -1 -3  1  1 -3  1  3 -3  1  1 -3 -3 -1 -1 |
| 26 | -3 -1  1  3  1  1 -3 -1 -1 -3  3 -3  3  1 -3  3 -3  1 -1  1 -3  1  1  1 |
| 27 | -1 -3  3  3  1  1  3 -1 -3 -1 -1 -1  3  1 -3 -3 -1  3 -3 -1 -3 -1 -3 -1 |
| 28 | -1 -3 -1 -1  1 -3 -1 -1  1 -1 -3  1  1 -3  1 -3 -3  3  1  1 -1  3 -1 -1 |
| 29 |  1  1 -1 -1 -3 -1  3 -1  3 -1  1  3  1 -1  3  1  3 -3 -3  1 -1 -1  1  3 |

17 different hopping patterns and 30 different sequence shift patterns are present. Sequence group hopping may be enabled or disabled by a parameter for activating group hopping provided by a higher layer.

Although the PUCCH and the PUSCH have the same hopping pattern, the PUCCH and the PUSCH may have different sequence shift patterns.

The group hopping pattern $f_{gh}(n_s)$ is the same for the PUSCH and the PUCCH and is given by the following equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}, \quad [\text{Equation 7}]$$

where c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The definition of the sequence shift pattern $f_{ss}$ varies between the PUCCH and the PUSCH.

RS hopping is described below.

The sequence group number u in a slot $n_s$ may be defined as shown in the following equation 6 by a group hopping pattern $f_{gh}(n_s)$ and a sequence shift pattern $f_{ss}$.

$$u = (f_{gh}(n_s) + f_{ss}) \bmod 30, \quad [\text{Equation 6}]$$

where mod denotes a modulo operation.

The sequence shift pattern $f_{ss}^{PUCCH}$ of the PUCCH is $f_{ss}^{PUCCH} = N_{ID}^{cell} \bmod 30$ and the sequence shift pattern $f_{ss}^{PUCCH}$ of the PUSCH is $f_{ss}^{PUSCH} = (f_{ss}^{PUCCH} + \Delta_{ss}) \bmod 30$. $\Delta_{ss} \in \{0, 1, \ldots 29\}$ is configured by a higher layer.

The following is a description of sequence hopping.

Sequence hopping is applied only to an RS having a length of $M_{sc}^{RS} \geq 6N_{sc}^{RB}$.

For an RS having a length of $M_{sc}^{RS} < 6N_{sc}^{RB}$, a base sequence number v within a base sequence group is v=0.

For an RS having a length of $M_{sc}^{RS} \geq 6N_{sc}^{RB}$, base sequence number v within a base sequence group in a slot $n_s$ is given by the following equation 8.

$$v = \begin{cases} c(n_s) & \text{if group hopping is disabled and} \\ & \text{sequence hopping is enabled} \\ 0 & \text{otherwise} \end{cases} \quad \text{[Equation 8]}$$

where c(i) denotes a pseudo-random sequence and a parameter for enabling sequence hopping provided by a higher layer determines whether or not sequence hopping is possible. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined in the following manner.

The RS sequence $r^{PUSCH}(\cdot)$ for the PUCCH is defined as $r^{PUSCH}(m \cdot M_{sc}^{RS} + n) = r_{u,v}^{(\alpha)}(n)$. Here, m and n satisfy $$m = 0, 1$$
$$n = 0, \ldots, M_{sc}^{RS} - 1$$

and satisfy $M_{sc}^{RS} = M_{sc}^{PUSCH}$.

A cyclic shift in one slot is given by $\alpha = 2\pi n_{cs}/12$ together with $n_{cs} = (n_{DMRS}^{(1)} + n_{DMRS}^{(2)} + n_{PRS}(n_s)) \mod 12$.

Here, $n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is given by $n_{PRS}(n_s) = \sum_{i=0}^{7} c(8 \cdot n_s + i) \cdot 2^i$.

c(i) is a pseudo-random sequence and c(i) is also a cell-specific value. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\beta_{PUSCH}$ and is mapped to the same physical resource block (PRB) set used for the corresponding PUSCH within the sequence that starts at $r^{PUSCH}(0)$. When the sequence is mapped to a resource element (k,l) (l=3 for a normal CP and l=2 for an extended CP) within a subframe, the order of k is first increased and the slot number is then increased.

In summary, a ZC sequence is used along with cyclic extension if the length is greater than or equal to $3N_{sc}^{RB}$ and a computer-generated sequence is used if the length is less than $3N_{sc}^{RB}$. The cyclic shift is determined according to a cell-specific cyclic shift, a UE-specific cyclic shift, a hopping pattern, and the like.

Figure 12A:
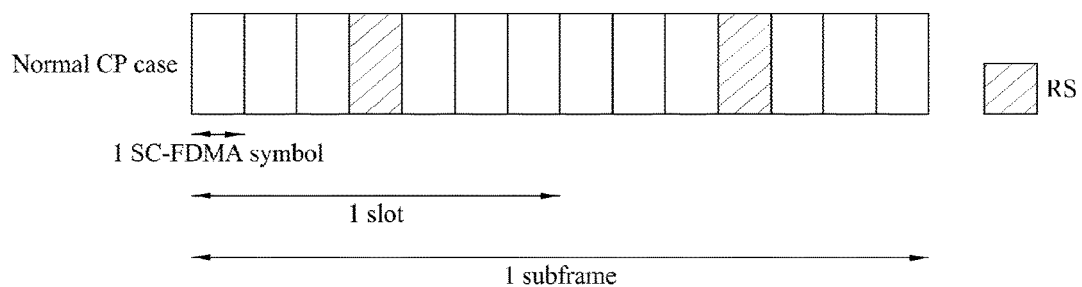
FIG. 12A shows demodulation reference signal (DMRS) structures for a physical uplink shared channel (PUSCH).
Figure 12B:
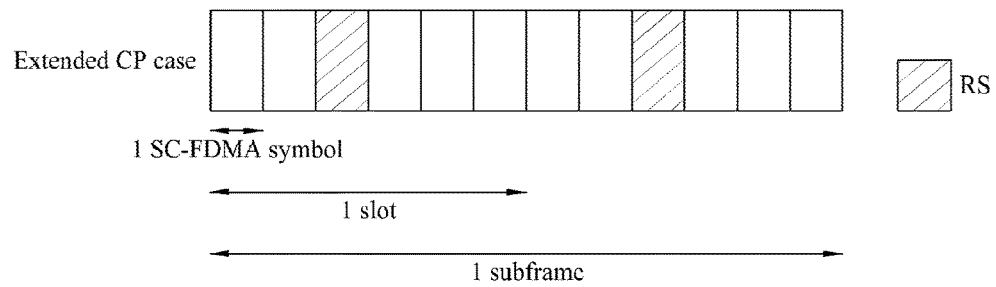
FIG. 12B shows demodulation reference signal (DMRS) structures for a physical uplink shared channel (PUSCH).

FIG. 12A illustrates the structure of a demodulation reference signal (DMRS) for a PUSCH in the case of normal CP and FIG. 12B illustrates the structure of a DMRS for a PUSCH in the case of extended CP. In the structure of FIG. 12A, a DMRS is transmitted through fourth and eleventh SC-FDMA symbols and, in the structure of FIG. 12B, a DMRS is transmitted through third and ninth SC-FDMA symbols.

FIGS. 13 to 16 illustrate a slot level structure of a PUCCH format. The PUCCH includes the following formats in order to transmit control information.

(1) Format 1: Used for on-off keying (OOK) modulation and scheduling request (SR)

(2) Format 1a and Format 1b: Used for ACK/NACK transmission

1) Format 1a: BPSK ACK/NACK for one codeword

2) Format 1b: QPSK ACK/NACK for two codewords (3) Format 2: Used for QPSK modulation and CQI transmission (4) Format 2a and Format 2b: Used for CQI and ACK/NACK simultaneous transmission.

Table 4 shows a modulation scheme and the number of bits per subframe according to PUCCH format. Table 5 shows the number of RSs per slot according to PUCCH format. Table 6 shows SC-FDMA symbol locations of an RS according to PUCCH format. In Table 4, the PUCCH formats 2a and 2b correspond to the case of normal CP.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol location of RS | |
|---|---|---|
| | Normal CP | Extended CP |
| 1, 1a, 1b | 2, 3, 4 | 2, 3 |
| 2, 2a, 2b | 1, 5 | 3 |

Figure 13:
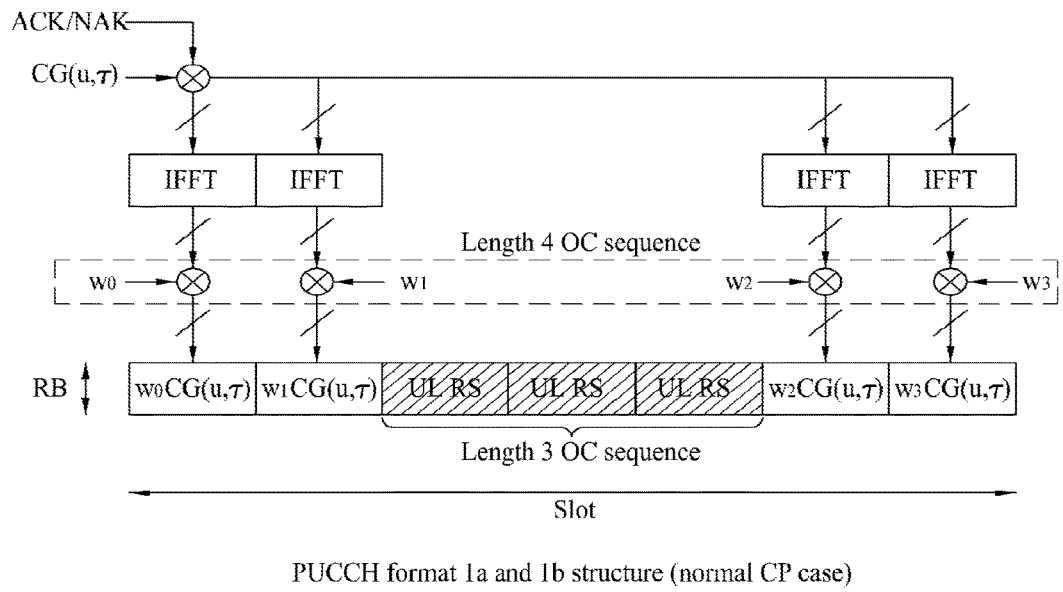
FIGS. 13 and 14 exemplarily show slot level structures of PUCCH formats 1a and 1b.
Figure 14:
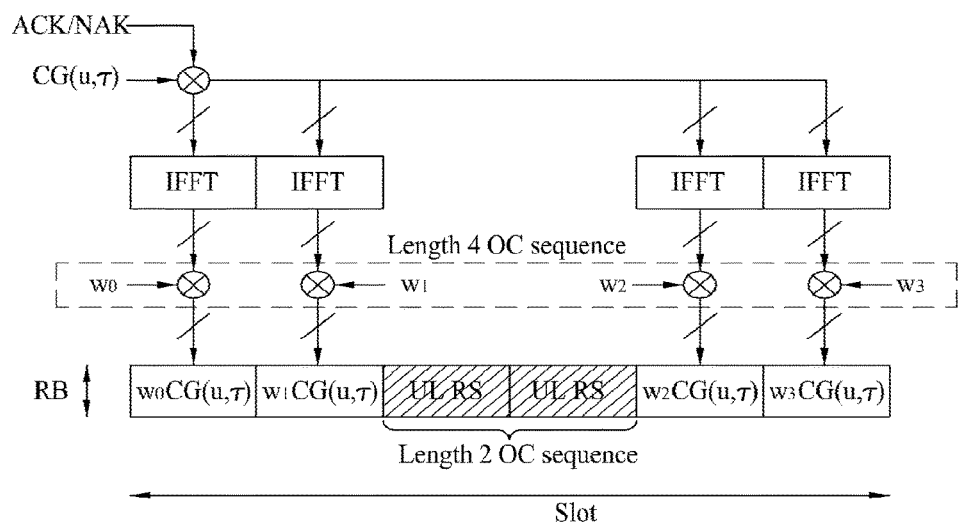

FIG. 13 shows a PUCCH format 1a and 1b structure in the case of a normal CP. FIG. 14 shows a PUCCH format 1a and 1b structure in the case of an extended CP. In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of CSs, OCs and PRBs may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

Figure 15:
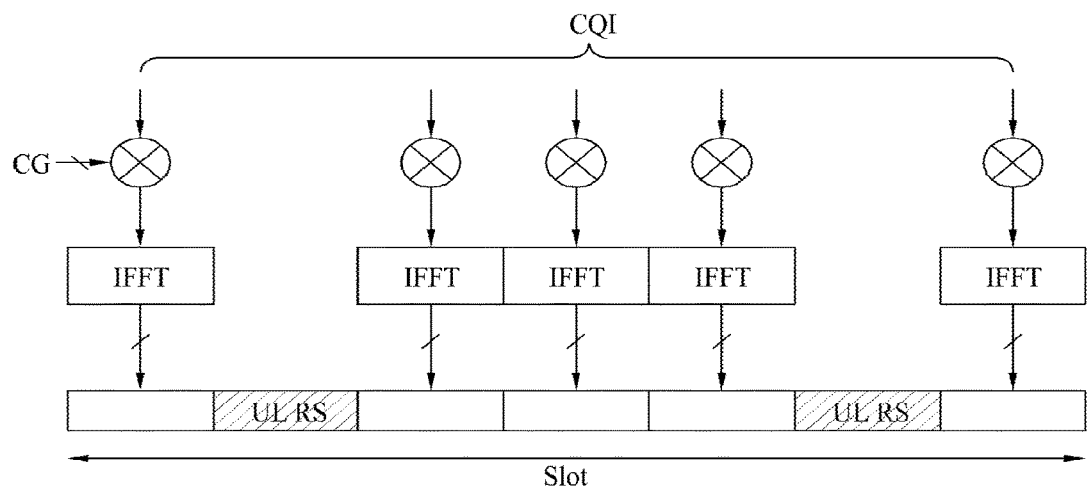
FIGS. 15 and 16 exemplarily show slot level structures of PUCCH formats 2/2a/2b.
Figure 16:
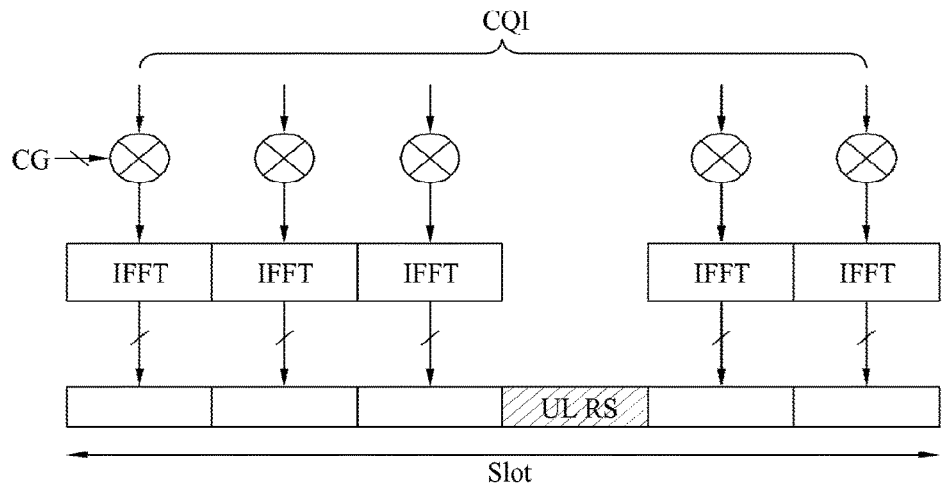

FIG. 15 shows a PUCCH format 2/2a/2b structure in the case of the normal CP. FIG. 16 shows a PUCCH format 2/2a/2b structure in the case of the extended CP. As shown in FIGS. 15 and 16, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

Length-4 and length-3 orthogonal sequences (OCs) for PUCCH formats 1/1a/1b are shown in the following Tables 7 and 8.

TABLE 7

Length-4 orthogonal sequences for PUCCH formats 1/1a/1b

| Sequence index $n_{oc}$ ($n_s$) | Orthogonal sequences [w(0) . . . [w($N_{SF}^{PUCCH}$ − 1)] |
|---|---|
| 0 | Error! Objects cannot be created from editing field codes. |
| 1 | Error! Objects cannot be created from editing field codes. |
| 2 | Error! Objects cannot be created from editing field codes. |

TABLE 8

Length-3 orthogonal sequences for PUCCH formats 1/1a/1b

| Sequence index $n_{oc}$ ($n_s$) | Orthogonal sequences [w(0) . . . w($N_{SF}^{PUCCH}$ − 1)] |
|---|---|
| 0 | [1 1 1] |
| 1 | [1 $e^{j2\pi/3}$ $e^{j4\pi/3}$ ] |
| 2 | [1 $e^{j4\pi/3}$ $e^{j2\pi/3}$ ] |

The orthogonal sequences (OCs) for the RS in the PUCCH formats 1/1a/1b are shown in Table 9.

TABLE 9

| | 1a and 1b | |
|---|---|---|
| Sequence index $\bar{n}_{oc}$ ($n_s$) | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b when $\Delta_{shift}^{PUCCH}=2$.

Figure 18:
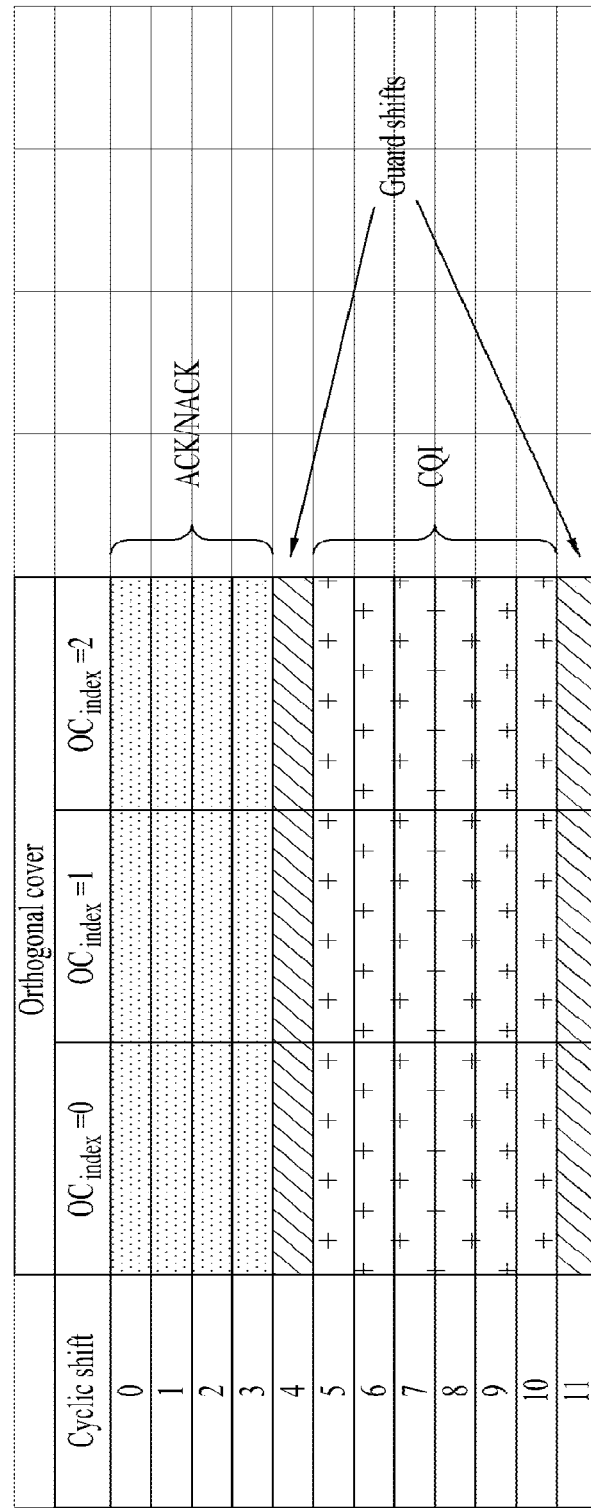
FIG. 18 is a diagram showing channelization of a structure in which PUCCH formats 1/1a/1b and PUCCH formats 2/2a/2b are mixed within the same PRB.

FIG. 18 illustrates channelization of a structure in which PUCCH formats 1/1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization (2) Slot level CS/OC remapping 1) For inter-cell interference randomization 2) Slot-based access for mapping between ACK/NACK channels and resources (k)

A resource $n_r$ for PUCCH formats 1/1a/1b includes the following combination.

(1) CS(=DFT OC in a symbol level) ($n_{cs}$)

(2) OC (OC in a slot level) ($n_{oc}$)

(3) Frequency RB ($n_{rb}$)

When indices representing the CS, the OC and the RB are $n_{cs}$, $n_{oc}$ and $n_{rb}$, respectively, a representative index $n_r$ includes $n_{cs}$, $n_{oc}$ and $n_{rb}$. That is, $n_r=(n_{cs}, n_{oc}, n_{rb})$.

A CQI, a PMI, an RI, and a combination of a CQI and an ACK/NACK may be transmitted through PUCCH formats 2/2a/2b. Here, Reed Muller (RM) channel coding may be applied.

For example, in the LTE system, channel coding for a UL CQI is described as follows. A bit stream $a_0$, $a_1$, $a_2$, $a_3$, . . . , $a_{A-1}$ is channel-coded using a (20, A) RM code. Table 10 shows a base sequence for the (20, A) code. $a_0$ and $a_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the encoded bits. Before QPSK modulation, the encoded bits may be scrambled.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 9.

$$b_i = \sum_{n=0}^{A-1} (a_n \cdot M_{i,n}) \bmod 2, \quad \text{[Equation 9]}$$

where $i=0, 1, 2, \ldots, B-1$.

Table 11 shows an uplink control information (UCI) field for broadband reporting (single antenna port, transmit diversity or open loop spatial multiplexing PDSCH) CQI feedback.

TABLE 11

| Field | Bandwidth |
|---|---|
| Wideband CQI | 4 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband reporting.

TABLE 13

| | Bit widths | | |
|---|---|---|---|
| | 2 antenna ports | 4 antenna ports | |
| Field | | Up to two layers | Up to four layers |
| RI (Rank Indication) | 1 | 1 | 2 |

Figure 19:
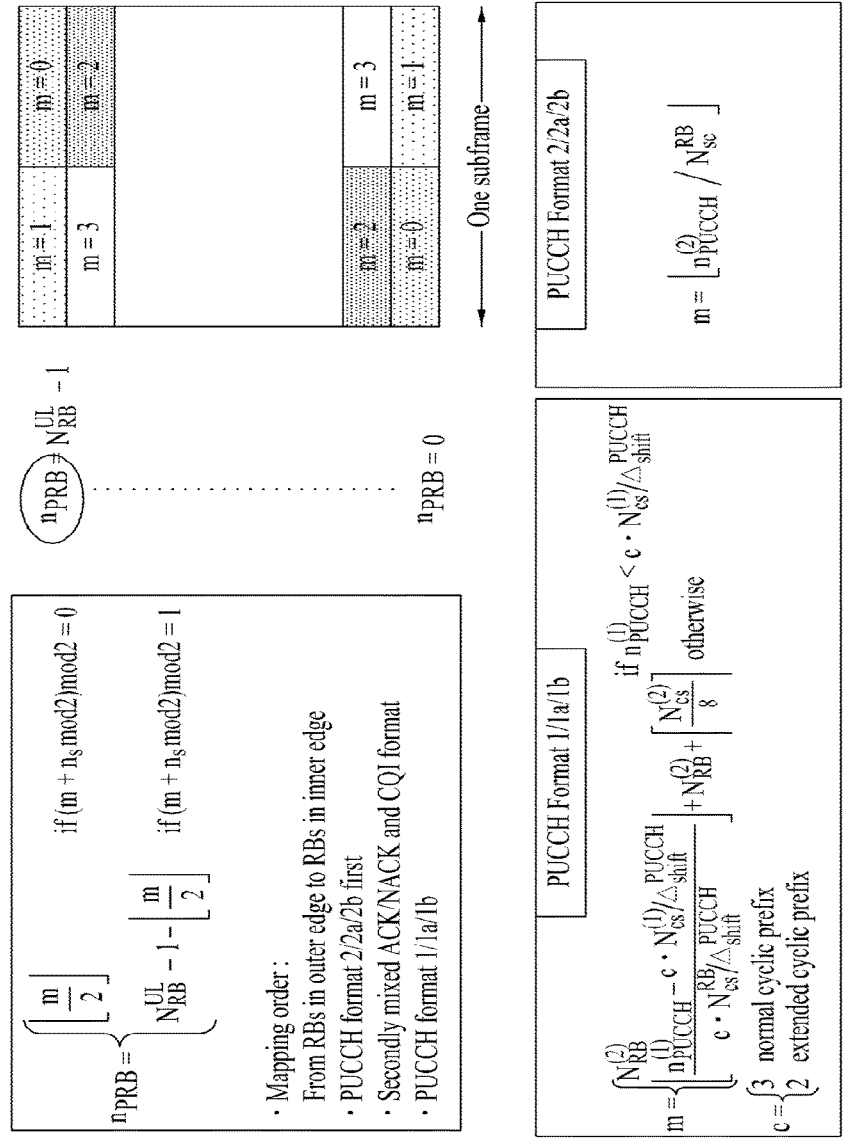
FIG. 19 is a diagram showing allocation of a physical resource allocation (PRB) used to transmit a PUCCH.

FIG. 19 shows PRB allocation. As shown in FIG. 19, the PRB may be used for PUCCH transmission in slot $n_s$.

The term "multi-carrier system" or "carrier aggregation system" refers to a system for aggregating and utilizing a plurality of carriers having a bandwidth smaller than a target bandwidth for broadband support. When a plurality of carriers having a bandwidth smaller than a target bandwidth is aggregated, the bandwidth of the aggregated carriers may be limited to a bandwidth used in the existing system for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support carrier aggregation. The term "multi-carrier" may be used interchangeably with the terms "carrier aggregation" and "bandwidth aggregation". The term "carrier aggregation" may refer to both contiguous carrier aggregation and non-contiguous carrier aggregation.

Figure 20:
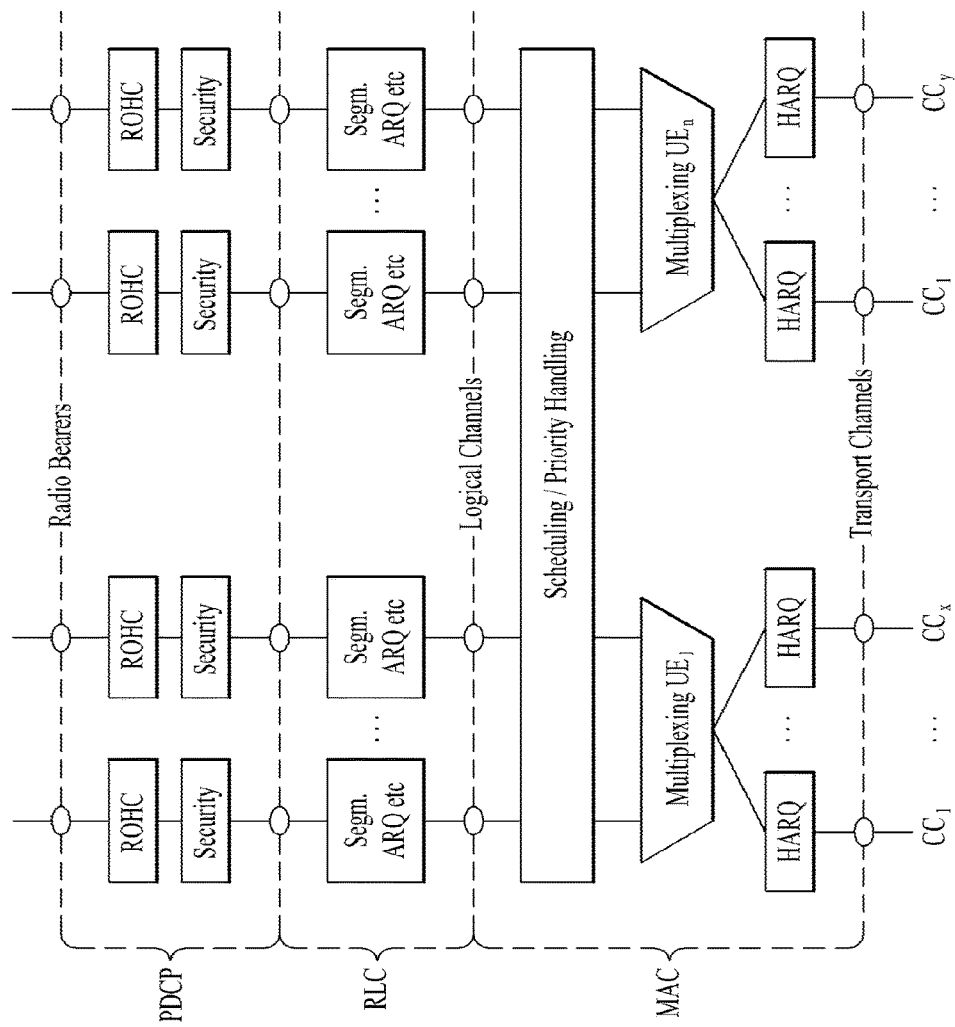
FIG. 20 is a conceptual diagram of management of a downlink component carrier (DL CC) in a base station (BS).
Figure 21:
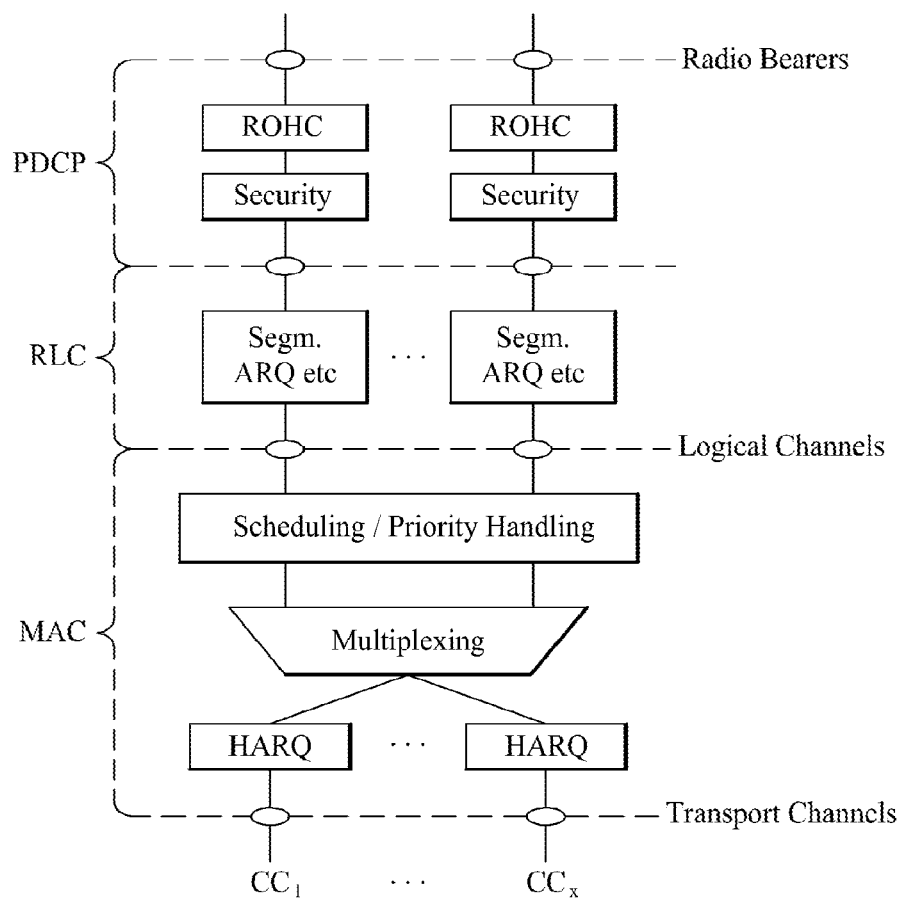
FIG. 21 is a conceptual diagram of management of an uplink component carrier (UL CC) in a user equipment (UE).

FIG. 20 is a conceptual diagram illustrating management of downlink component carriers (DL CCs) in a base station (BS) and FIG. 21 is a conceptual diagram illustrating management of uplink component carriers (UL CCs) in a user equipment (UE). For ease of explanation, the higher layer is simply described as a MAC (or a MAC entity) in the following description of FIGS. 20 and 21.

Figure 22:
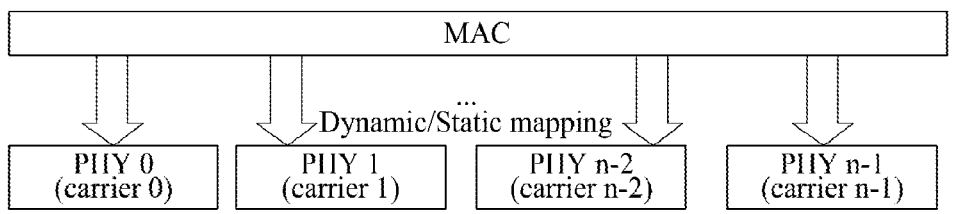
FIG. 22 is a conceptual diagram of the case where one MAC layer manages multiple carriers in a BS.
Figure 23:
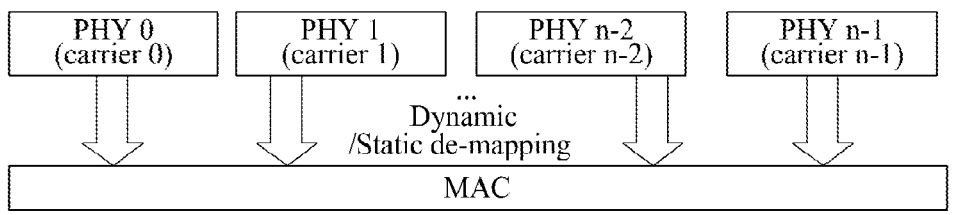
FIG. 23 is a conceptual diagram of the case where one MAC layer manages multiple carriers in a UE.

FIG. 22 is a conceptual diagram illustrating management of multiple carriers by one MAC entity in a BS. FIG. 23 is a conceptual diagram illustrating management of multiple carriers by one MAC entity in a UE.

As shown in FIGS. 22 and 23, one MAC manages and operates one or more frequency carriers to perform transmission and reception. Frequency carriers managed by one MAC need not be contiguous and as such they are more flexible in terms of resource management. In FIGS. 22 and 23, it is assumed that one PHY (or PHY entity) corresponds to one component carrier (CC) for ease of explanation. One PHY does not always indicate an independent radio frequency (RF) device. Although one independent RF device generally corresponds to one PHY, the present invention is not limited thereto and one RF device may include a plurality of PHYs.

Figure 24:
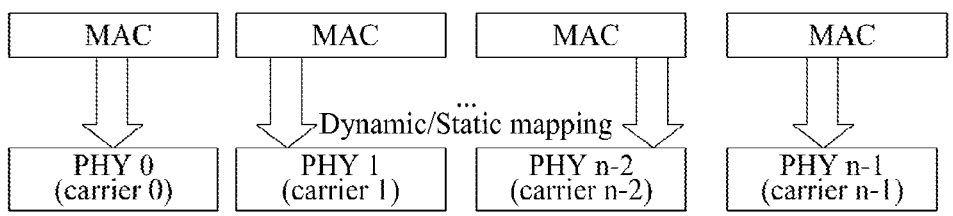
FIG. 24 is a conceptual diagram of the case where one MAC layer manages multiple carriers in a BS.
Figure 25:
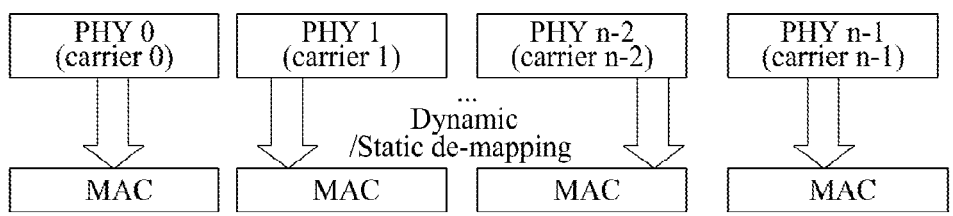
FIG. 25 is a conceptual diagram of the case where a plurality of MAC layers manages multiple carriers in a UE.
Figure 26:
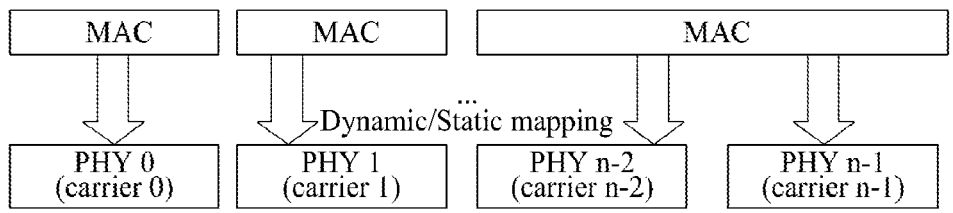
FIG. 26 is a conceptual diagram of the case where a plurality of MAC layers manages multiple carriers in a BS according to one embodiment of the present invention.
Figure 27:
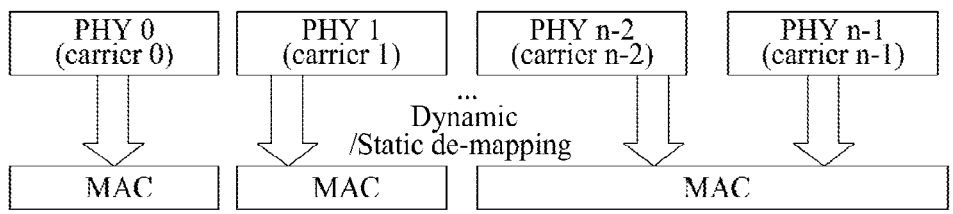
FIG. 27 is a conceptual diagram of the case where a plurality of MAC layers manages multiple carriers from the viewpoint of UE reception according to another embodiment of the present invention.

FIG. 24 is a conceptual diagram illustrating management of multiple carriers by a plurality of MAC entities in a BS. FIG. 25 is a conceptual diagram illustrating management of multiple carriers by a plurality of MAC entities in a UE. FIG. 26 illustrates another scheme of management of multiple carriers by a plurality of MAC entities in a BS. FIG. 27 illustrates another scheme of management of multiple carriers by a plurality of MAC entities in a UE.

Unlike the structures of FIGS. 22 and 23, a number of carriers may be controlled by a number of MAC entities rather than by one MAC as shown in FIGS. 24 to 27.

As shown in FIGS. 24 and 25, carriers may be controlled by MACs on a one to one basis. As shown in FIGS. 26 and 27, some carriers may be controlled by MACs on a one to one basis and one or more remaining carriers may be controlled by one MAC.

The above-mentioned system includes a plurality of carriers (i.e., 1 to N carriers) and carriers may be used so as to be contiguous or non-contiguous to each other. This scheme may be equally applied to UL and DL. The TDD system is constructed so as to manage N carriers, each including downlink and uplink transmission, and the FDD system is constructed such that multiple carriers are applied to each of uplink and downlink. The FDD system may also support asymmetrical carrier aggregation in which the numbers of carriers aggregated in uplink and downlink and/or the bandwidths of carriers in uplink and downlink are different.

When the number of component carriers (CCs) aggregated in uplink (UL) is identical to the number of CCs aggregated in downlink (DL), all CCs may be configured so as to be compatible with the conventional system. However, this does not mean that CCs that are configured without taking into consideration such compatibility are excluded from the present invention.

Hereinafter, it is assumed for ease of explanation description that, when a PDCCH is transmitted through DL component carrier #0, a PDSCH corresponding to the PDCCH is transmitted through DL component carrier #0. However, it is apparent that cross-carrier scheduling may be applied such that the PDSCH is transmitted through a different DL component carrier. The term "component carrier" may be replaced with other equivalent terms (e.g., cell).

Figure 28:
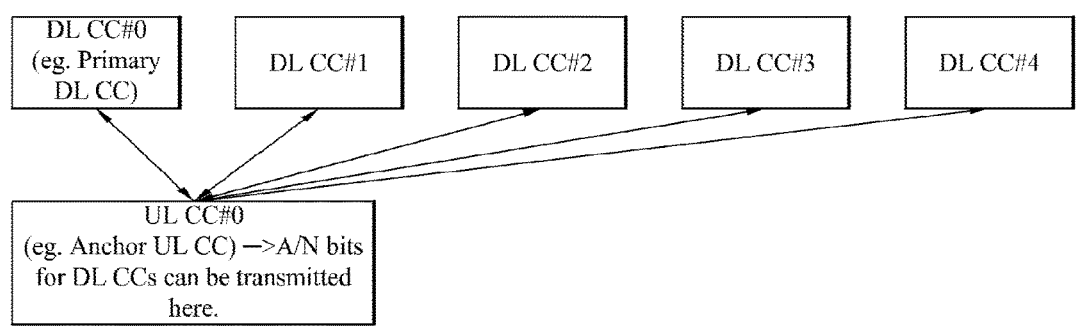
FIG. 28 is a diagram showing asymmetric carrier aggregation (CA) in which a plurality of downlink component carriers (DL CCs) and one uplink CC are linked.
Figure 29A:
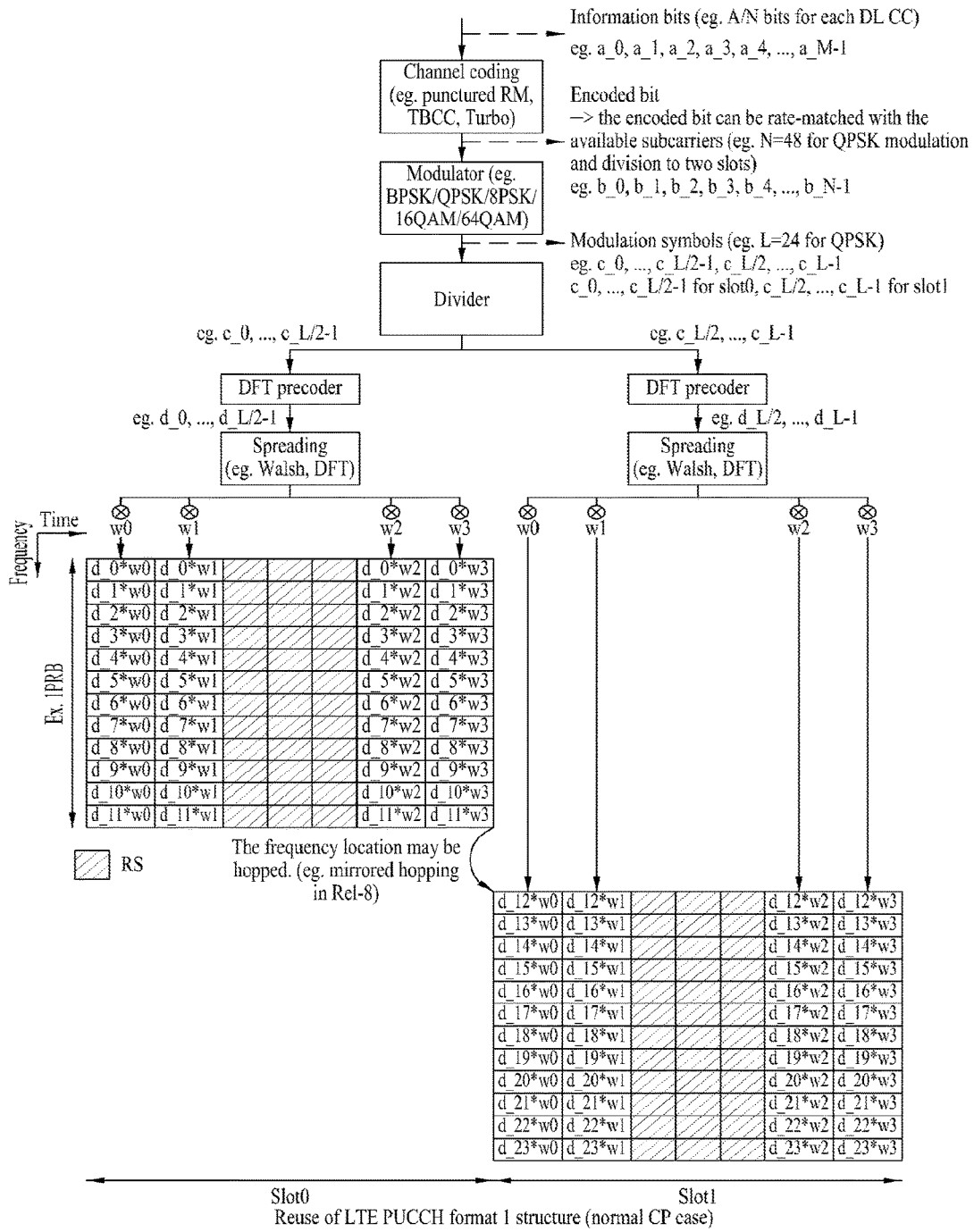
FIGS. 29A to 29F are conceptual diagrams illustrating a DFT-S-OFDMA format structure and associated signal processing according to the embodiments of the present invention.
Figure 29B:
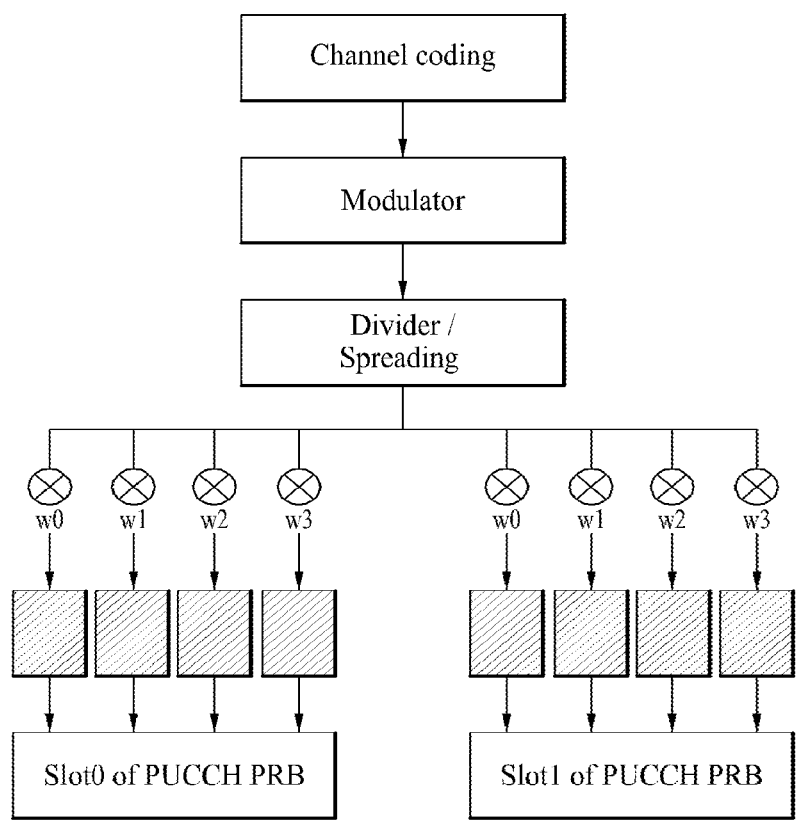
Figure 29C:
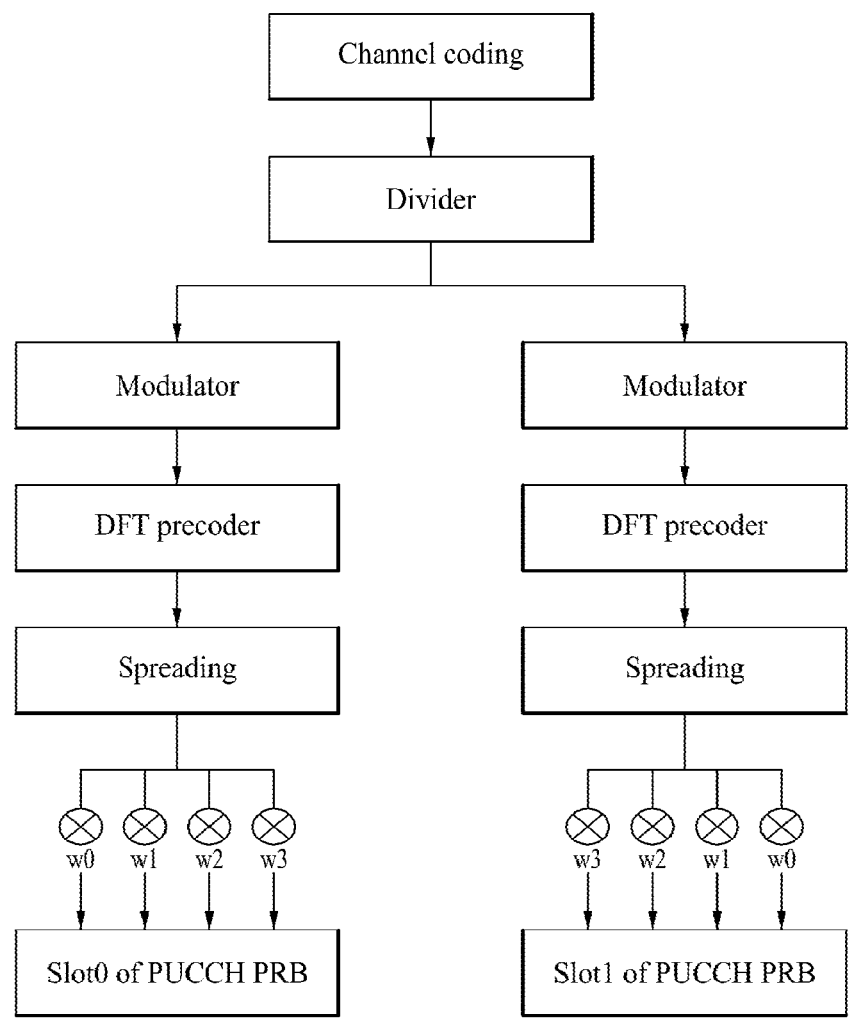
Figure 29D:
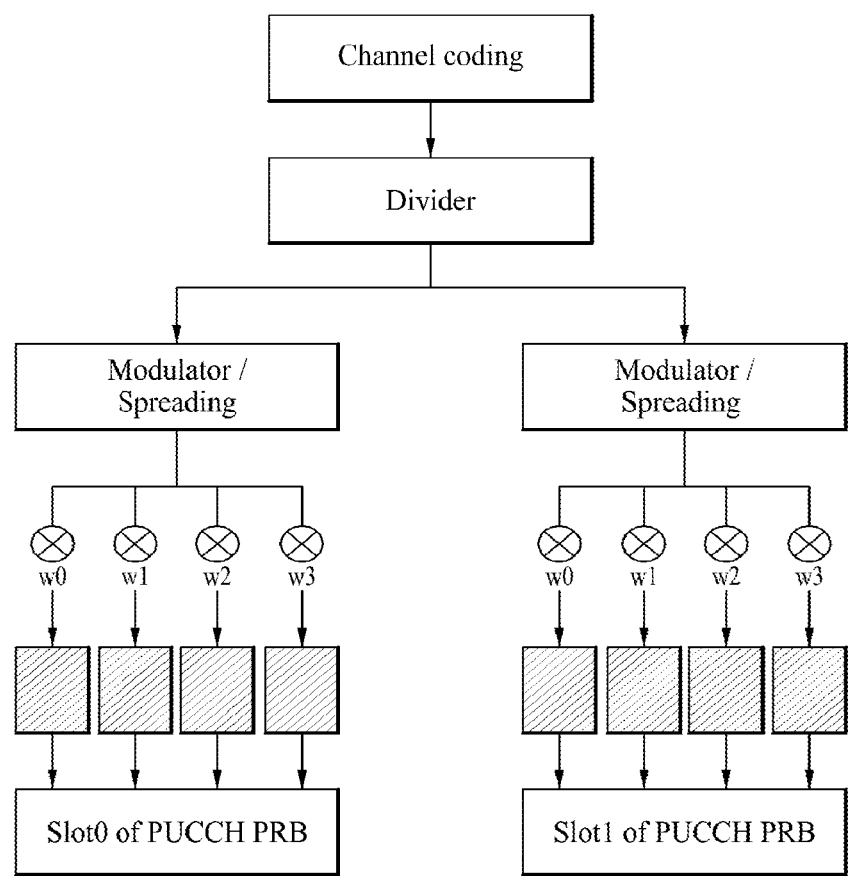
Figure 29E:
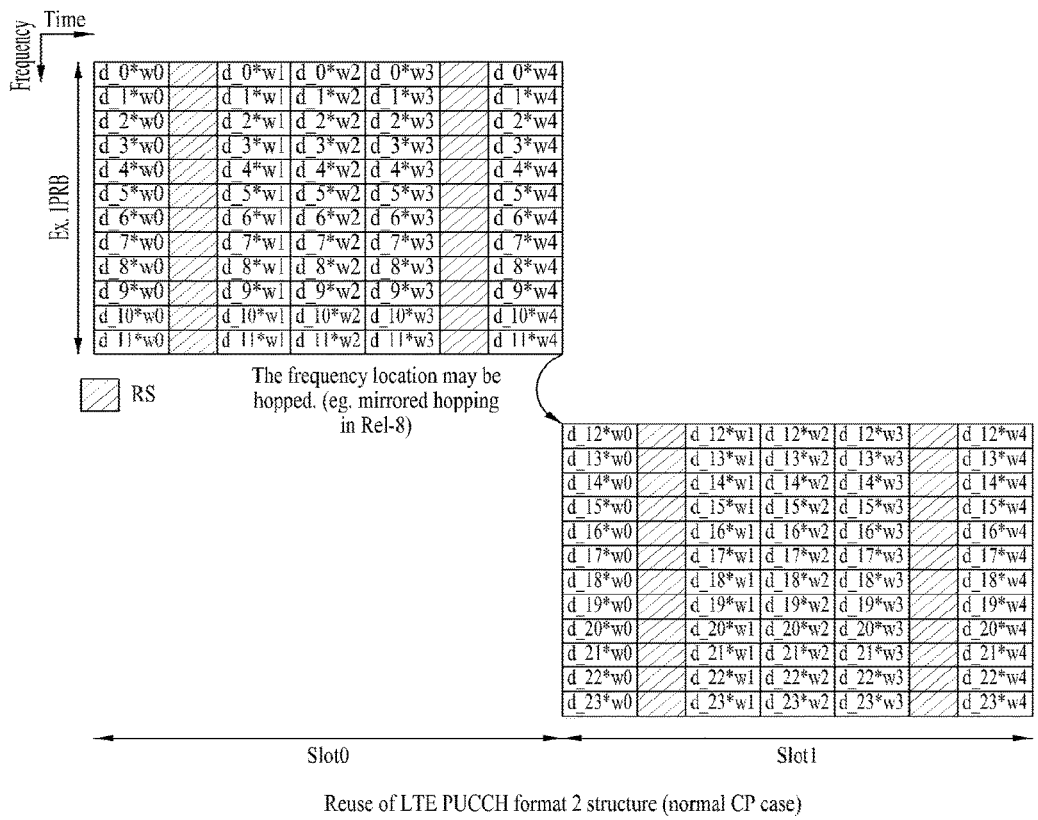
Figure 29F:
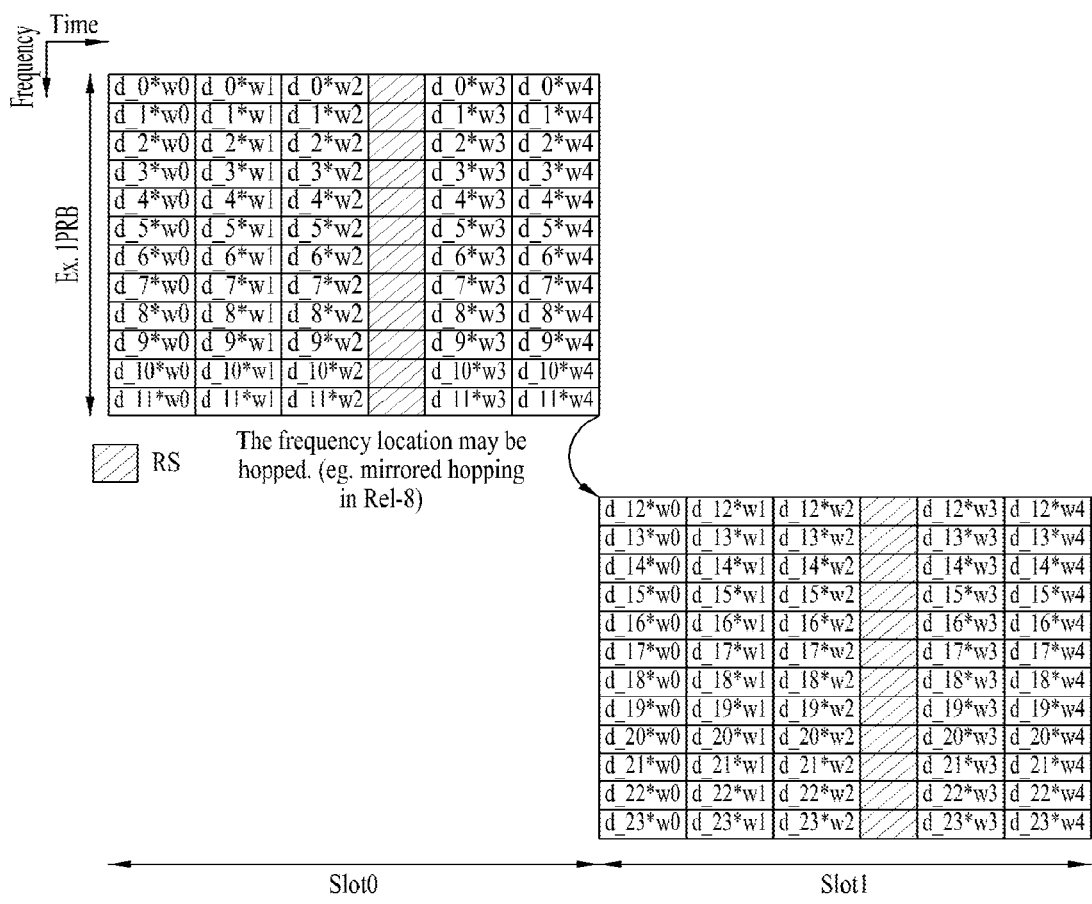

FIG. 28 shows a scenario in which uplink control information (UCI) is transmitted in a radio communication system supporting carrier aggregation (CA). For ease of explanation, it is assumed in this example that the UCI is ACK/NACK (A/N). However, the UCI may include control information such as channel state information (CSI) (e.g., CQI, PMI, RI, etc.) or scheduling request information (e.g., SR, etc.).

FIG. 28 shows asymmetric carrier aggregation in which 5 DL CCs and one UL CC are linked. The illustrated asymmetric carrier aggregation may be set from the viewpoint of UCI transmission. That is, a DL CC-UL CC linkage for UCI and a DL CC-UL CC linkage for data may be set differently. When it is assumed for ease of explanation that one DL CC can carry up to two codewords, at least two ACK/NACK bits are needed. In this case, in order to transmit an ACK/NACK for data received through 5 DL CCs through one UL CC, at least 10 ACK/NACK bits are needed. In order to also support a discontinuous transmission (DTX) state for each DL CC, at least 12 bits ($=5^5=3125=11.61$ bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs.

A DL primary CC may be defined as a DL CC linked with a UL primary CC. Here, linkage includes implicit and explicit linkage. In LTE, one DL CC and one UL CC are uniquely paired. For example, a DL CC that is linked with a UL primary CC by LTE pairing may be referred to as a DL primary CC. This may be regarded as implicit linkage. Explicit linkage indicates that a network configures the linkage in advance and may be signaled by RRC or the like. In explicit linkage, a DL CC that is paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. The DL primary CC may also be configured through higher layer signaling. The DL primary CC may be a DL CC in which a UE performs initial access. DL CCs other than the DL primary CC may be referred to as DL secondary CCs. Similarly, UL CCs other than the UL primary CC may be referred to as UL secondary CCs.

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). DL CC may also be referred to as DL Cell, and UL CC may also be referred to as UL Cell. In addition, the anchor (or primary) DL CC may also be referred to as DL PCell, and the anchor (or primary) UL CC may also be referred to as UL PCell. The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells including a PCell and a SCell are provided. For CA, a network can configure one or more SCells for a UE that supports CA in addition to a PCell initially configured during a connection establishment procedure after an initial security activation procedure.

DL-UL may correspond only to FDD. DL-UL pairing may not be defined for TDD since TDD uses the same frequency. In addition, a DL-UL linkage may be determined from a UL linkage through UL E-UTRA Absolute Radio Frequency Channel Number (EARFCN) of SIB2. For example, the DL-UL linkage may be acquired through SIB2 decoding when initial access is performed and may be acquired through RRC signaling otherwise. Accordingly, only the SIB2 linkage may be present and other DL-UL pairing may not be defined. For example, in the 5DL:1UL structure of FIG. 28, DL CC #0 and UL CC #0 may be in an SIB2 linkage relation with each other and other DL CCs may be in an SIB2 linkage relation with other UL CCs which have not been set for the UE.

CSI (for example, CQI, PMI, RI, or a combination thereof) transmitted on PUCCH will hereinafter be described in detail. CSI is periodically transmitted on PUCCH. That is, the subframe for PUCCH CSI may be periodically configured. The periodic CSI has the limited number of bits (e.g., 11 bits) compared to aperiodic CSI feedback that is fed back through PUSCH. The periodic CSI may be transmitted through PUCCH formats 2/2a/2b. In addition, CQI/PMI and RI are not transmitted on the same subframe. The latest transmitted RI is used to calculate the wideband CQI/PMI.

The periodic CSI reporting procedure of the legacy LTE will hereinafter be described with reference to FIGS. 30 and 31.

FIG. 30 exemplarily shows CSI reporting transmitted on PUCCH. Referring to FIG. 30, a user equipment (UE) periodically feeds back CQI, PMI and/or RI on PUCCH according to a PUCCH reporting mode. Information (e.g., period, offset, etc.) for periodically reporting the CSI is semi-statically configured.

Wideband feedback
Mode 1-0 description:
In the subframe where RI is reported (only for transmission mode 3):
UE determines an RI assuming transmission on the set S of subbands.
n. • The UE reports a PUCCH type 3 report consisting of one RI.
In the subframe where CQI is reported:
UE reports a type 4 report consisting of one wideband CQI value which is calculated assuming transmission on the set S of subbands. The wideband CQI represents channel quality for the first codeword even in the case of RI>1.
For a transmission mode 3, the CQI is calculated on the basis of the last reported periodic RI. For other transmission modes, CQI is calculated on the basis of Transmission Rank 1
Mode 1-1 description:
In the subframe where RI is reported (only for transmission mode 4 and transmission mode 8):
The UE determines an RI assuming transmission on the set S of subbands.
The UE reports a type 3 report consisting of one RI.
In the subframe where CQI/PMI is reported:
A single precoding matrix is selected from the codebook subset assuming transmission on the set S of subbands.
UE reports a type 2 report on each successive reporting opportunity consisting of the following items (1) to (3):

(1) A single wideband CQI value which is calculated assuming the use of a single precoding matrix in all subbands and transmission on the set S of subbands.
(2) The selected single precoding matrix indicator (wideband PMI).
(3) When RI>1, a 3-bit wideband spatial differential CQI, which is shown in Table 7.2-2.
For transmission mode 4 and transmission mode 8, the PMI and CQI are calculated on the basis of the last reported periodic RI. For other transmission modes, they are calculated on the basis of transmission Rank 1.
UE Selected subband feedback
Mode 2-0 description:
In the subframe where RI is reported (only for transmission mode 3):
UE determines an RI assuming transmission on the set S of subbands.
The UE reports a type 3 report consisting of one RI.
In the subframe where wideband CQI is reported:
The UE shall report a type 4 report on each successive reporting opportunity consisting of one wideband CQI value which is calculated assuming transmission on the set S of subbands. The wideband CQI represents channel quality for the first codeword even in the case of RI>1.
For transmission mode 3, the CQI is calculated on the basis of the last reported periodic RI. For other transmission modes, the CQI is calculated on the basis of transmission Rank 1.
In the subframe where CQI for the selected subbands is reported:
The UE shall select the preferred subband within the set of $N_j$ subbands in each of the J bandwidth parts where J is given in Table 14.
The UE shall report a PUCCH type 1 report consisting of one CQI value reflecting transmission only over the selected subband of a bandwidth part determined in the previous step along with the corresponding preferred subband L-bit label. PUCCH type 1 report for each bandwidth part will in turn be reported in respective successive reporting opportunities. The CQI represents channel quality for the first codeword even in the case of RI>1.
For transmission mode 3, the preferred subband selection and CQI values are calculated on the basis of the last reported periodic RI. For other transmission modes, CQI is calculated on the basis of transmission Rank 1.
Mode 2-1 description:
In the subframe where RI is reported (only for transmission mode 4 and transmission mode 8):
UE shall determine an RI assuming transmission on the set S of subbands.
The UE shall report a type 3 report consisting of one RI.
In the subframe where wideband CQI/PMI is reported:
A single precoding matrix is selected from the codebook subset assuming transmission on the set S of subbands.
UE shall report a PUCCH type 2 report on each respective successive reporting opportunity consisting of:
A wideband CQI value which is calculated assuming the use of a single precoding matrix in all subbands and transmission on the set S of subbands.
The selected single precoding matrix indicator (wideband PMI).

When RI>1, and additional 3-bit wideband spatial differential CQI.

For transmission mode 4 and transmission mode 8, PMI and CQI values are calculated on the basis of the last reported periodic RI. For other transmission modes, PMI and CQI are calculated conditioned on transmission rank 1.

In the subframe where CQI for the selected subbands is reported:

The UE shall select the preferred subband within the set of $N_j$ subbands in each of J bandwidth parts where J is given in Table 14.

The UE shall report a PUCCH type 1 report per bandwidth part on each respective successive reporting opportunity consisting of the following items (1) and (2):

(1) CQI value for codeword 0 reflecting transmission only over the selected subband of a bandwidth part determined in the previous step along with the corresponding preferred subband L-bit label.

(2) When RI>1, an additional 3-bit subband spatial differential CQI value for codeword 1 offset level. Codeword 1 offset level=subband CQI index for codeword 0 subband CQI index for codeword 1.

It is assumed that the most recently reported single precoding matrix in all subbands and transmission on the set S of subbands are used.

For transmission mode 4 and transmission mode 8, the subband selection and CQI values are calculated on the basis of the last reported periodic wideband PMI and RI. For other transmission modes, the subband selection and CQI values are calculated on the basis of the last reported PMI and transmission Rank 1.

FIG. 31 exemplarily shows a method for periodically feeding back a CSI for a UE-selected subband on PUCCH. The UE selects one subband for each bandwidth part (BP) within the set S (or whole BW), and reports the selected subband only once at every CSI period. BP is composed of $N_J$ CQI subbands, and the CQI subband is composed of k RBs.

Figure 32:
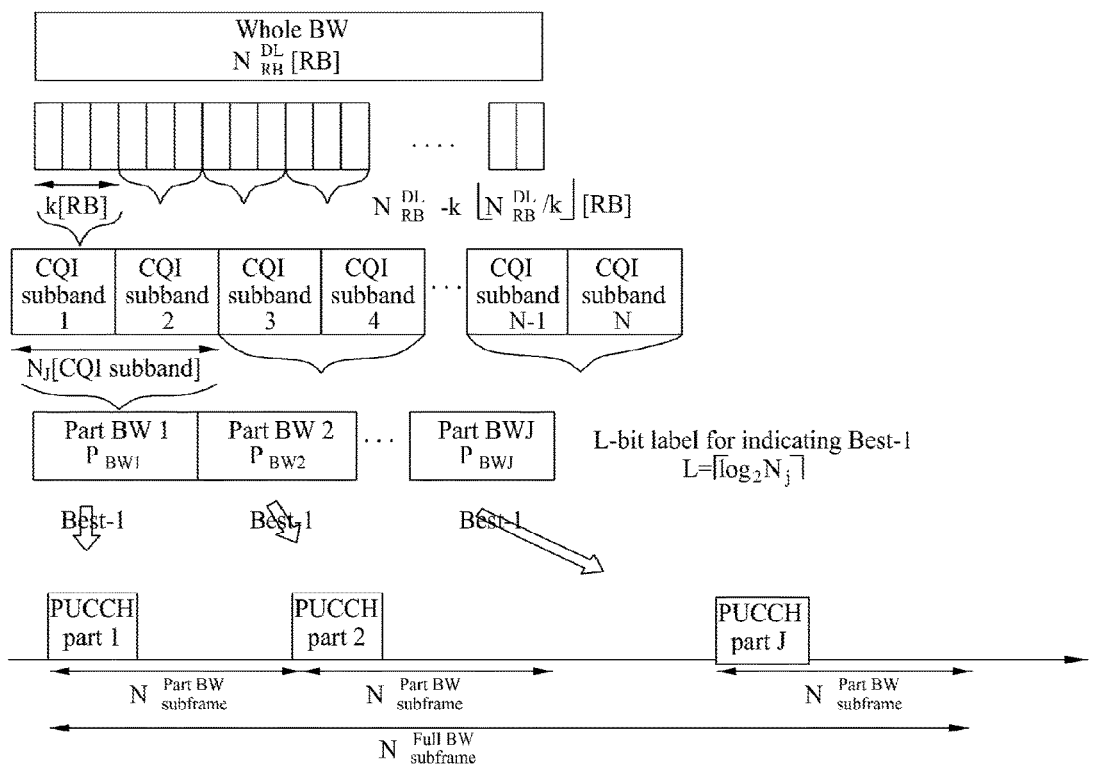

FIG. 32 exemplarily shows the sizes of a bandwidth part (BP) and a subband when the UE selection scheme is used. Referring to FIG. 32, the sizes of BP and subband are dependent upon a system bandwidth $N_{RB}^{DL}$. Meanwhile, if two codebooks are present, a wideband spatial differential CQI may be used for the second codeword. The wideband spatial differential CQI is obtained by subtracting the wideband CQI for codeword 2 from the wideband CQI for codeword 1. The wideband spatial differential CQI represents an offset value for the wideband CQI for codeword 1. The offset value may be information of 3 bits, and the set of offset values is denoted by {−4, −3, −2, −1, 0, 1, 2, 3}.

The following reporting modes are supported on PUCCH according to transmission modes. The transmission modes are semi-statically established by higher layer (e.g., RRC) signaling. Each of the following reporting modes will hereinafter be referred to as Mode.

Transmission mode 1: Mode 1-0, Mode 2-0
Transmission mode 2: Mode 1-0, Mode 2-0
Transmission mode 3: Mode 1-0, Mode 2-0
Transmission mode 4: Mode 1-1, Mode 2-1
Transmission mode 5: Mode 1-1, Mode 2-1
Transmission mode 6: Mode 1-1, Mode 2-1
Transmission mode 7: Mode 1-0, Mode 2-0
Transmission mode 8: Mode 1-1, Mode 2-1 (if the UE configured with PMI/RI reporting); or Mode 1-0, Mode 2-0 (if the UE is configured without PMI/RI reporting)

The periodic CQI reporting mode is given by the parameter cqi-FormatIndicatorPeriodic which is configured by higher layer signaling.

For the UE-selected subband CQI, a CQI report in a certain subframe describes a channel quality in a particular part or in particular parts of the bandwidth described subsequently as bandwidth part (BP) or parts. The bandwidth parts shall be indexed in the order of increasing frequency and non-increasing sizes starting at the lowest frequency.

There are a total of N subsbands for a system bandwidth given by $N_{RB}^{DL}$ where $\lfloor N_{RB}^{DL}/k \rfloor$ subbands are of size k. If $\lceil N_{RB}^{DL}/k \rceil - \lfloor N_{RB}^{DL}/k \rfloor > 0$ one of the subbands is of size $N_{RB}^{DL} - k \cdot \lfloor N_{RB}^{DL}/k \rfloor$.

A bandwidth part j is frequency-consecutive and consists of $N_j$ subbands. The relationship among the subband size (k), the bandwidth part (J), and the downlink system bandwidth is shown in Table 14. If J=1, $N_j$ is $\lceil N_{RB}^{DL}/k/J \rceil$. If J>1, $N_j$ is either $\lceil N_{RB}^{DL}/k/J \rceil$ or $\lceil N_{RB}^{DL}/k/J \rceil - 1$, depending on $N_{RB}^{DL}$, k and J.

Each bandwidth part j (where 0≤j≤J−1), is scanned in sequential order according to increasing frequency.

For UE selected subband feedback, a single subband from among $N_j$ subbands of a bandwidth part is selected along with a corresponding L-bit label indexed in the order of increasing frequency, where $L=\lceil \log_2 \lceil N_{RB}^{DL}/k/J \rceil \rceil$.

TABLE 14

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Table 15 exemplarily shows a variety of CSI information, mode states, and PUCCH reporting modes according to PUCCH report types. The PUCCH reporting payload sizes are given according to PUCCH report types and mode states. The PUCCH report types are classified according to reported CSI contents. The PUCCH report type may be referred to as another equivalent expression (for example, PUCCH format). If the PUCCH report type and periods/offsets of CQI/PMI/RI are given, the UE reports the CSI according to the PUCCH report type at a given subframe.

TABLE 15

| PUCCH | | | PUCCH Reporting Modes | | | |
|---|---|---|---|---|---|---|
| Report Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |

TABLE 15-continued

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 2 | Wideband CQI/PMI | 2 TX Antennas RI = 1 | 6 | 6 | NA | NA |
| | | 4 TX Antennas RI = 1 | 8 | 8 | NA | NA |
| | | 2 TX Antennas RI > 1 | 8 | 8 | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

As can be seen from Table 15, the following four PUCCH report types are supported.

PUCCH report type 1 supports CQI feedback for the UE selected sub-bands.

PUCCH report type 2 supports wideband CQI and PMI feedback.

PUCCH report type 3 supports RI feedback

PUCCH report type 4 supports wideband CQI

Periodicity $N_p$ (in subframes) and offset $N_{OFFSET,CQI}$ (in subframes) for CQI/PMI reporting are determined based on the parameter cqi-pmi-ConfigIndex ($I_{CQI/PMI}$). Table 16 shows the mapping relationship among $I_{CQI/PMI}$, $N_p$ and $N_{OFFSET,CQI}$ for FDD, and Table 17 shows the mapping relationship among $I_{CQI/PMI}$, $N_p$ and $N_{OFFSET,CQI}$ for TDD. Periodicity $M_{RI}$ and relative offset $N_{OFFSET,RI}$ for RI reporting are determined based on the parameter ri-ConfigIndex ($I_{RI}$) given in Table 18. Both cqi-pmi-ConfigIndex and ri-ConfigIndex are configured by higher layer signaling. The relative reporting offset for RI $N_{OFFSET,RI}$ takes one value from the set o $\{0,-1,\ldots,-(N_p-1)\}$.

In the case where wideband CQI/PMI reporting is configured, the reporting instances for wideband CQI/PMI are considered to be subframes capable of satisfying $(10 \times n_f + \lfloor n_s/2 \rfloor - N_{OFFSET,CQI})$ mod $N_p = 0$, where $n_f$ is a frame number and $n_s$ is a slot number.

If RI reporting is configured, the reporting interval of the RI reporting is an integer multiple $M_{RI}$ of period $N_p$ (in subframes). The reporting instances for RI are considered to be subframes satisfying $(10 \times n_f + \lfloor n_s/2 \rfloor - N_{OFFSET,CQI} - N_{OFFSET,RI})$mod$(N_p \cdot M_{RI})=0$. In case of collision of RI and wideband CQI/PMI, the wideband CQI/PMI is dropped.

In the case where both wideband CQI/PMI and subband CQI reporting are configured, the reporting instances for wideband CQI/PMI and subband CQI are considered to be subframes satisfying $(10 \times n_f + \lfloor n_s/2 \rfloor - N_{OFFSET,CQI})$mod $N_p = 0$. The wideband CQI/PMI report has period $H \cdot N_p$, and is reported on the subframes satisfying $(10 \times n_f + \lfloor n_s/2 \rfloor - N_{OFFSET,CQI})$mod$(H \cdot N_p)=0$. The integer H is defined as $H=J \cdot K+1$, where J is the number of bandwidth parts. Between every two consecutive CQI/PMI reports, the remaining J·K reporting instances are used for CQI reports.

In case RI reporting is configured, the reporting interval of RI is $M_{RI}$ times the wideband CQI/PMI period $H \cdot N_p$, and RI is reported on the same PUCCH cyclic shift resources as those of both the wideband CQI/PMI and subband CQI reports. The reporting instances for RI are considered to be subframes satisfying $(10 \times n_f + \lfloor n_s/2 \rfloor - N_{OFFSET,CQI} - N_{OFFSET,RI})$mod$(H \cdot N_p \cdot M_{RI})=0$. In case of collision between RI and wideband CQI/PMI (or subband CQI), the wideband CQI/PMI (or subband) CQI is dropped.

The CQI/PMI or RI report shall be transmitted on the PUCCH resource $n_{PUCCH}^{(2)}$ for PUCCH format 2. $n_{PUCCH}^{(2)}$ is UE-specific and configured by higher layers. In case of collision between CQI/PMI/RI and positive SR in the same subframe, CRI/PMI/RI is dropped.

TABLE 16

| $I_{CQI/PMI}$ | Value of $N_P$ | Value of $N_{OFFSET, CQI}$ |
|---|---|---|
| 0 ≤ $I_{CQI/PMI}$ ≤ 1 | 2 | $I_{CQI/PMI}$ |
| 2 ≤ $I_{CQI/PMI}$ ≤ 6 | 5 | $I_{CQI/PMI}$ − 2 |
| 7 ≤ $I_{CQI/PMI}$ ≤ 16 | 10 | $I_{CQI/PMI}$ − 7 |
| 17 ≤ $I_{CQI/PMI}$ ≤ 36 | 20 | $I_{CQI/PMI}$ − 17 |
| 37 ≤ $I_{CQI/PMI}$ ≤ 76 | 40 | $I_{CQI/PMI}$ − 37 |
| 77 ≤ $I_{CQI/PMI}$ ≤ 156 | 80 | $I_{CQI/PMI}$ − 77 |
| 157 ≤ $I_{CQI/PMI}$ ≤ 316 | 160 | $I_{CQI/PMI}$ − 157 |
| $I_{CQI/PMI}$ = 317 | | Reserved |
| 318 ≤ $I_{CQI/PMI}$ ≤ 349 | 32 | $I_{CQI/PMI}$ − 318 |
| 350 ≤ $I_{CQI/PMI}$ ≤ 413 | 64 | $I_{CQI/PMI}$ − 350 |
| 414 ≤ $I_{CQI/PMI}$ ≤ 541 | 128 | $I_{CQI/PMI}$ − 414 |
| 542 ≤ $I_{CQI/PMI}$ ≤ 1023 | | Reserved |

TABLE 17

| $I_{CQI/PMI}$ | Value of $N_P$ | Value of $N_{OFFSET, CQI}$ |
|---|---|---|
| $I_{CQI/PMI}$ = 0 | 1 | $I_{CQI/PMI}$ |
| 1 ≤ $I_{CQI/PMI}$ ≤ 5 | 5 | $I_{CQI/PMI}$ − 1 |
| 6 ≤ $I_{CQI/PMI}$ ≤ 15 | 10 | $I_{CQI/PMI}$ − 6 |
| 16 ≤ $I_{CQI/PMI}$ ≤ 35 | 20 | $I_{CQI/PMI}$ − 16 |
| 36 ≤ $I_{CQI/PMI}$ ≤ 75 | 40 | $I_{CQI/PMI}$ − 36 |
| 76 ≤ $I_{CQI/PMI}$ ≤ 155 | 80 | $I_{CQI/PMI}$ − 76 |
| 156 ≤ $I_{CQI/PMI}$ ≤ 315 | 160 | $I_{CQI/PMI}$ − 156 |
| 316 ≤ $I_{CQI/PMI}$ ≤ 1023 | | Reserved |

TABLE 18

| $I_{RI}$ | Value of $M_{RI}$ | Value of $N_{OFFSET, RI}$ |
|---|---|---|
| 0 ≤ $I_{RI}$ ≤ 160 | 1 | −$I_{RI}$ |
| 161 ≤ $I_{RI}$ ≤ 321 | 2 | −($I_{RI}$ − 161) |
| 322 ≤ $I_{RI}$ ≤ 482 | 4 | −($I_{RI}$ − 322) |
| 483 ≤ $I_{RI}$ ≤ 643 | 8 | −($I_{RI}$ − 483) |
| 644 ≤ $I_{RI}$ ≤ 804 | 16 | −($I_{RI}$ − 644) |
| 805 ≤ $I_{RI}$ ≤ 965 | 32 | −($I_{RI}$ − 805) |
| 966 ≤ $I_{RI}$ ≤ 1023 | | Reserved |

For TDD periodic CQI/PMI reporting, the following periodicity values are used according to TDD UL/DL configurations.

The reporting period of $N_p=1$ is applicable only to TDD UL/DL configurations 0, 1, 3, 4, and 6, where all UL subframes in a radio frame are used for CQI/PMI reporting.

The reporting period of $N_p=5$ is applicable only to TDD UL/DL configurations 0, 1, 2, and 6.

The reporting periods of $N_p=\{10,20,40,80,160\}$ are applicable to all TDD UL/DL configurations.

For $N_{RB}^{DL} \leq 7$, Mode 2-0 and Mode 2-1 are not supported.

RI report in a periodic reporting mode is valid only for CQI/PMI report on the corresponding periodic reporting mode.

The calculation of CQI/PMI is based on the last reported RI. In case of the absence of the last reported RI, the UE shall conduct the CQI/PMI calculation conditioned on the lowest possible RI as given by the bitmap parameter codebookSubsetRestriction.

If a parameter ttiBundling provided by higher layers is set to TRUE and if an UL-SCH for use in the subframe bundling operation collides with a periodic CQI/PMI/RI reporting instance, the UE shall drop the periodic CQI/PMI/RI report in the corresponding subframe and shall not multiplex periodic CQI/PMI and/or RI during the PUSCH transmission in the corresponding subframe.

In carrier aggregation (CA), collision may occur while each CSI (CQI/PMI/RI) of multiple DL CCs is fed back. For example, it is assumed that periodic CSI feedbacks for individual DL CCs are independently configured. In this case, since PUCCH can be transmitted only in a predetermined UL PCell irrespective of a carrier aggregation (CA) situation, the UE may simultaneously feed back necessary information in the same subframe according to CSI configurations. In this case, since multiple PUCCH resources are simultaneously transmitted in a single subframe, an undesirable situation may occur in consideration of IMD (Intermodulation distortion) or CM (Cubic Metric). The present invention provides a solution for overcoming the above-mentioned situation. For convenience of description and better understanding of the present invention, CC may be one of PCell (Primary Cell) or SCell (Secondary Cell). PCell may be a cell n which the UE performs initial access, and it is assumed that PCell may be reconfigured through subsequent RRC signaling. PCell and SCell will hereinafter be referred to as a cell or a serving cell.

A method for solving collision of multiple CSI reports will hereinafter be described. For convenience of description, it is assumed that a plurality of serving cells is configured. In addition, it is assumed that periodic CSI feedback for each serving cell is independently configured for each cell. The present invention proposes a method for performing only one CSI reporting within one subframe on the assumption of the above-mentioned description. The subframe for CSI reporting is given by a period and offset according to CSI configuration. For each serving cell, a period and an offset for CQI/PMI may be given, and a period and an offset for RI may be independently given.

In more detail, if CSI reporting events of multiple serving cells are generated in a given subframe (that is, if CSIs of multiple serving cells collide with each other), the present invention proposes a method for performing only CSI reporting of a specific serving cell. For this purpose, transmission of the remaining CSI reporting other than only one specific CSI reporting from among a plurality of colliding CSI reports may be dropped. A method (or condition) for selecting only one specific CSI reporting will hereinafter be described in detail. For convenience of description, although individual methods (or conditions) are disclosed separately from each other, it should be noted that they may be combined with each other or the application order of individual methods (or conditions) may be defined in various ways.

First Method (or First Condition)

If CSI reports of multiple serving cells collide with each other within a given subframe, CSI reporting of the corresponding serving cell may be dropped according to priority of the CSI reporting. The priority of CSI reporting may be determined according to priority of target CSI information to be transmitted. Although the scope or spirit of the present invention is not limited thereto, priority of CSI information may be determined to be RI>PMI=CQI. For example, if CQI and/or PMI transmission for DL SCell#0 and RI transmission for DL SCell#1 occur in the same subframe, CQI and/or PMI transmission having relatively low priority may be omitted (or dropped). Alternatively, a wideband (WB) CQI feedback may have higher priority than a subband (SB) CQI feedback. That is, if SB feedback for DL PCell and WB feedback for DL SCell#2 are generated in the same subframe, CSI reporting for DL SCell#2 is performed and CSI reporting for DL PCell may be dropped.

As can be seen from Table 15, CSI reporting of the serving cell is defined using PUCCH report types. Therefore, on the assumption of RI>PMI=CQI, priorities of PUCCH report types may be denoted by "PUCCH report type 2>PUCCH report type 1=3=4". In accordance with the above-mentioned example, CSI reporting for DL SCell#0 may be PUCCH report type 1, 3 or 4, and CSI reporting for DL SCell#1 may be PUCCH report type 2. Therefore, CSI reporting for DL SCell#0 having a lower priority is dropped.

In accordance with the first method, CSI reporting of multiple serving cells may have the same priority. Accordingly, in the case of using the first condition, if priorities of PUCCH report types cause collision of CSI reports among the same serving cells, an additional condition for selecting only one specific CSI reporting is needed. In this case, CSI reports (i.e., CSI reports of other serving cells) other than only one specific CSI report (i.e., CSI report of a specific serving cell) are dropped.

Second Method (or Second Condition)

Priority is assigned to each DL Cell (or CC) so that it is determined whether CSI reporting is dropped. For example, higher priority may be assigned to feedback for DL PCell. In more detail, if CQI, PMI or RI transmission events for DL PCell, and CQI, PMI or RI transmission events for DL SCell#1 and SCell#2 occur in the same subframe, only CSI report for PCell having a relatively high priority may be transmitted, and CSI reports for SCell#1 and SCell#2 may be dropped. CSI report of SCell may be dropped according to cell priority. If CSI report for PCell is not transmitted, CSI report may be transmitted on PUCCH according to the priority relationship predetermined among SCells. For example, priority is assigned to CSI reporting of the serving cell having the lowest (or the highest) physical/logical indexes, so that only feedback of the corresponding serving cell can be transmitted. That is, if feedback of SCell#1 collides with feedback of SCell#2, only the feedback of SCell#1 having the lowest index may be transmitted and the feedback of SCell#2 may be dropped.

On the other hand, SCell is additionally configured after PCell has been configured, so that (logical) index of PCell has the lowest value and (logical) index of at least one SCell may have a subsequent value. proposed condition may be generalized as: if CSI reports of multiple serving cells collide with each other in a given subframe, only CSI report of the serving cell having the lowest index may be performed and CSI reports of other serving cells may be dropped, without distinction between PCell and SCell. In contrast, a specific case in which a (logical) index of PCell has the highest value may be considered. In this case, the proposed condition may be generalized as: if CSI reports of multiple serving cells collide with each other within a given serving cell, only CSI report of the serving cell having the highest index may be performed and CSI reports of other serving cells may be dropped, without distinction between PCell and SCell.

In another example, after CSI priority of a cell domain is configured in the network, CSI priority (or cell priority from the viewpoint of CSI reporting) may be signaled to the UE through RRC signaling. For example, the priority information of DL PCell>SCell#2>SCell#1>SCell#0 is signaled from the BS to the UE, and the UE may drop CSI reports other than one CSI report according to such priority information. The priority information may be associated with a Quality of Service (QoS) that may be configured in different ways according to individual DL Cells. For example, DL Cell having a relatively high QoS may perform CSI reporting having a higher priority. QoS may be signaled to each cell from the network to the UE.

In another example, priority of CQI reporting may be configured according to a drop count. For example, assuming that the number of CSI report drop times of DL SCell#1 is 'a' and the number of CSI report drop times of DL SCell#2 is 'b', CSI report for DL SCell having a higher (or smaller) number of drop times between 'a' and 'b' times may be dropped.

In another example, priority may be assigned to CSI report of DL Cell having a short transmission period (i.e., a high number of transmission frequencies) on the condition that CSI report is configured for each cell. If the CSI report has a short transmission period, the network may assign a higher priority to the corresponding DL Cell, so that CSI report of the corresponding DL Cell may have a higher priority. In contrast, priority may be assigned to CSI report of DL Cell having a long transmission period (i.e., a low transmission frequency) under the condition that CSI reporting is configured per cell. The long transmission period means that there is a low possibility of feeding back the CSI report, so that the number of feedback opportunities may be lost when CSI reporting of the corresponding cell is dropped. Accordingly, priority may be assigned to the CSI reporting having DL Cell having a long transmission period.

In another example, priority of the serving cell may be configured according to scheduling types (e.g., self-scheduling, cross-scheduling, etc.) from the viewpoint of CSI reporting. For example, from the viewpoint of CSI reporting, priority of the self-scheduling cell (e.g., self-scheduling PCell or self-scheduling SCell) may be higher than priority of cross-scheduling cell (e.g., cross-scheduling SCell). Therefore, if CSI reports of multiple serving cells collide with each other within a given subframe, priority may be assigned to CSI reporting of the self-scheduling cell and CSI reporting of the cross-scheduling cell may be dropped. In contrast, priority of the cross-scheduling cell (e.g., cross-scheduling PCell) may be higher than priority of the self-scheduling cell (e.g., self-scheduling PCell or self-scheduling SCell). Accordingly, if CSI reports of multiple serving cells collide with each other within a given subframe, priority may be assigned to CSI reporting of the cross-scheduling cell, and CSI reporting of the self-scheduling cell may be dropped.

The above-mentioned cell priority method may be applied to all the colliding CSI reports, or may also be applied to some CSI reports from among all the CSI reports. For example, the above-mentioned cell priority method may be applied only to CSI reports of different serving cells having the same priority. In this case, another method (e.g., the first method) may be applied to CSI reports of different serving cells having different priorities.

In the meantime, if multiple CSI report events occur in the same subframe, multiple CSI reports can be joint-coded. For example, when CSI report for DL PCell and CSI report for DL SCell#1 should be transmitted in the same subframe, CSI information for two serving cells may be joint-coded and transmitted. Such joint coding may be carried out using Reed-Muller (RM) coding. If a total size of information bits to be joint-coded exceeds 11 or 13 bits capable of being accommodated in PUCCH format 2, MSM (Multi Sequence Modulation) based PUCCH format or DFT-S-OFDM based PUCCH format (See FIG. 29) may be transmitted. In this case, since a front part of information bit streams has higher reliability due to RM coding characteristics, CSI information for DL PCell (or DL Cell having high priority) may be located at the front part.

In addition, it is undesirable that RI having relatively high priority from among CSI information is dropped, so that the drop rule is applied to CQI/PMI and the RI may be specially joint-coded. Since RI is composed of a maximum of 2 bits per DL serving cell, a total of 10 bits must be joint-coded with 5 DL serving cells, so that this size can be accommodated in PUCCH format 2. In this case, since a front part of information bit streams has higher reliability due to RM coding characteristics, CSI information for DL PCell (or DL Cell having high priority) may be located at the front part.

Alternatively, WB CQI feedback may have a higher priority than SB CQI feedback. That is, if SB feedback for DL PCell and WB feedback for DL SCell#2 are generated in the same subframe, CSI report for DL SCell#2 may be carried out and CSI report for DL PCell may be dropped.

The above-mentioned priority configuration methods may be used independently or in combination. For example, priority dependent upon UCI (e.g., RI) and cell priority concept (e.g., PCell priority) can be simultaneously used. In more detail, RI of PCell may be assigned the highest priority, and RIs of SCells may be assigned the next priority. One or more SCells may follow priorities of SCells which are configured by RRC signaling or QoS, etc. Then, CQI/PMI of PCell may have the next priority, and CQI/PMI of SCells may have the next subsequent priority. As can be seen from Table 15, CSI report configuration of the serving cell is defined using PUCCH report types. Therefore, the above-mentioned contents can be summarized If CSI reports of multiple serving cells collide with each other within one subframe, CSI reporting of the serving cell including a PUCCH report type having a lower priority is dropped. If multiple serving cells having the same-priority PUCCH report types are present, CSI report of the serving cell having the lowest cell index (or CC) is transmitted, and CSI reports of the remaining serving cells are dropped.

Figure 33:
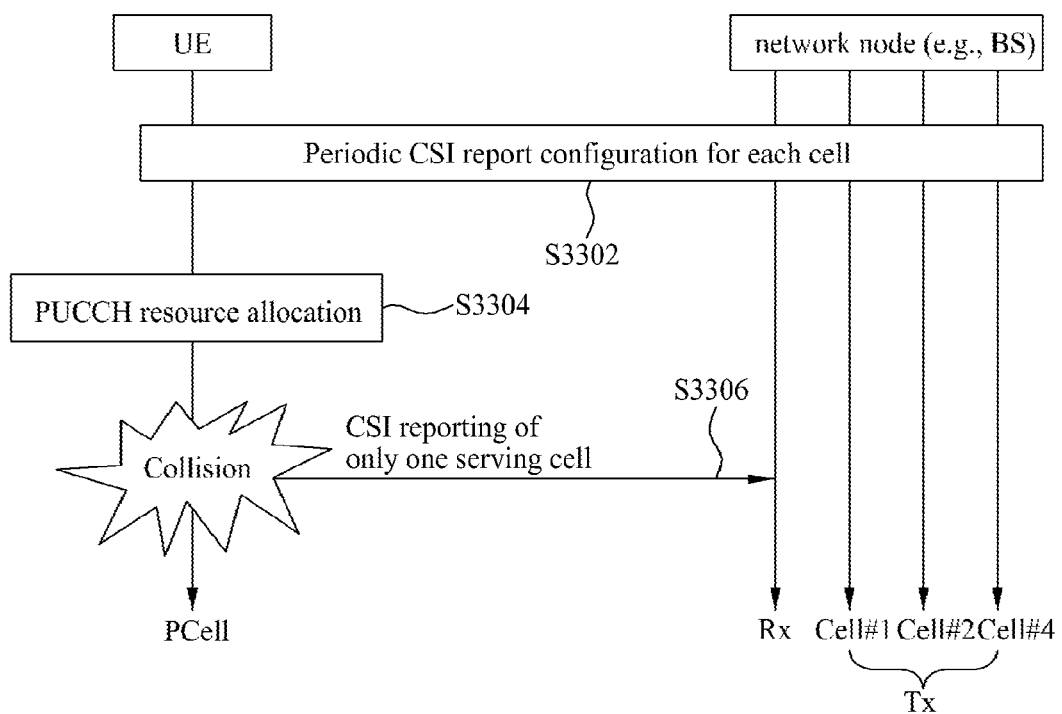
FIG. 33 is a flowchart illustrating a method for performing CSI report according to the embodiments of the present invention.

FIG. 33 is a flowchart illustrating a method for performing CSI report according to the embodiments of the present invention. In FIG. 33, it is assumed that three DL cells are configured. Three cells may indicate all cells configured for the corresponding UE or may also indicate only some activated cells from among the configured cells. The configured cell may include DL PCell and one or more DL SCells, and the configured cell, DL PCell and DL SCells will hereinafter be generically named a serving cell.

Referring to FIG. 33, the UE and the network node (e.g., BS or RN) may establish periodic CSI reporting configuration for each serving cell in step S3302. For this operation, the network node transmits configuration information for CSI reporting to the UE. The CSI reporting configuration information may include a variety of configuration information (e.g., PUCCH report type, period, offset, band size, etc.) disclosed in FIGS. 30 to 32. A method for performing the step S3302 will be described later with reference to a second embodiment. After configuration information for periodic CSI reporting is established, the UE may perform a PUCCH resource allocation procedure to carry out CSI reports of PUCCH report types/modes in the corresponding subframe according to CSI report configuration (step S3304). In more detail, the UE determines whether CSI reporting is performed in the corresponding subframe according to a CSI reporting period and an offset configured per serving cell, and determines whether PUCCH resources are allocated according to the determined result. PUCCH resource may include PUCCH formats 2/2a/2b.

Meanwhile, the aforementioned example assumes that a plurality of CSI reports (i.e., CSI reports of multiple serving cells) may collide with each other in the same subframe. Each CSI reporting may correspond to CSI reporting for the corresponding DL Cell. In this case, the UE transmits CSI reporting of only one serving cell over PUCCH, and drops CSI reporting of the remaining serving cells. Dropping of the CSI reporting may be achieved in step S3304 (i.e., a channel resource allocation process), or may be achieved before or after the step S3304 as necessary.

For convenience of description, it is assumed that CSI reports of three cells collide with each other in the same subframe, and PUCCH report types (See Table 18) of individual cells are configured as follows.

Case 1:
DL Cell #1 (i.e., Serving Cell #1): PUCCH Report Type 1
DL Cell #2 (i.e., Serving Cell #2): PUCCH Report Type 2
DL Cell #3 (i.e., Serving Cell #3): PUCCH Report Type 3

Referring to Table 18, PUCCH report types 1 and 2 are used for reporting a CQI, and PUCCH report type 3 is used for reporting an RI.

In accordance with the first method, since RI has a higher priority than CQI, CSI report of DL Cell #3 is transmitted and CSI reports of DL Cells #1 and #2 may be dropped.

In accordance with the second method, only CSI reporting of the serving cell having the lowest index can be transmitted. That is, CSI report of DL Cell #1 may be transmitted and CSI reports of DL Cells #2 and #3 may be dropped.

Case 2:
DL Cell #1 (i.e., serving cell #1): PUCCH Report Type 1
DL Cell #2 (i.e., serving cell #2): PUCCH Report Type 2
DL Cell #3 (i.e., serving cell #3): PUCCH Report Type 4

Referring to Table 18, PUCCH report type 1 is used to transmit a subband (SB) CQI, PUCCH report type 2 is used to transmit a wideband (WB) CQI/PMI, and PUCCH report type 4 is used to transmit a WB CQI.

In accordance with the first method, PUCCH report types 1, 2 and 4 are used for CQI reporting. In accordance with the implementation example, priorities of PUCCH report types 1, 2 and 4 may have the following relationship: (i) PUCCH report type 1=PUCCH report type 2=PUCCH report type 4; and (ii) PUCCH report type 1≠PUCCH report type 2=PUCCH report type 4, and PUCCH report type 1≠PUCCH report type 2≠PUCCH report type 4. In the cases of (i) and (ii), multiple PUCCH report types have the same priority, such that an additional method for transmitting only CSI reporting of a single serving cell is needed.

In accordance with the second method, only CSI reporting of the serving cell having the lowest index may be transmitted as an example. That is, CSI report of DL Cell #1 may be transmitted and CSI reports of DL Cells #2 and #3 may be dropped.

The first method and the second method may be combined with each other. For example, after the first method is used, the second method can be applied. For convenience of description, it is assumed that the case of (ii) is used in the above-mentioned example. In this case, the following CSI reporting transmission rule can be applied as follows.

TABLE 19

| Cell index | PUCCH report type | Priority | Application of First Method | Application of Second Method |
|---|---|---|---|---|
| Cell #1 | 1 | 2 | Drop | — |
| Cell #2 | 2 | 1 | Non-drop | Non-drop |
| Cell #3 | 4 | 1 | Non-drop | Drop |

Priority 1 may be higher than Priority 2.

Provided that the second method is applied to CSI reports of different serving cells having the same priority, the first method has no connection with the second method. If the first method is used after completion of the second method, the following result can be obtained as shown in Table 20.

TABLE 20

| Cell index | PUCCH Report Type | Priority | Application of Second Method | Application of First Method |
|---|---|---|---|---|
| Cell #1 | 1 | 2 | Non-drop | Drop |
| Cell #2 | 2 | 1 | Non-drop | Non-drop |
| Cell #3 | 4 | 1 | Drop | — |

Embodiment 2: Signaling for Configuring CSI Reporting

As described above, since periodic CSI reporting is transmitted over PUCCH, the periodic CSI reporting can always be transmitted through UL PCell irrespective of carrier aggregation (CA). In this case, it is assumed that periodic CSI reporting for each DL Cell (or DL CC) is independently configured. For this purpose, configuration information needed for CSI reporting of each serving cell may be transmitted through the corresponding DL Cell (or DL CC), or may be transmitted through PCell (or PCC), or may be transmitted through an arbitrary DL Cell (or DL CC).

Signaling contained in configuration information may be changed according to which DL Cell is used for transmission of periodic CSI report configuration information. Signaling methods for individual situations will hereinafter be described in detail.

1) In case that CSI report configuration information of the corresponding DL Cell is transmitted in each DL Cell (or DL CC):

Provided that the UE recognizes BW information of UL PCell, CSI reporting can be configured through higher layer signaling received from 3GPP LTE without any other signaling. In this case, the UE can perform CSI reporting without generating ambiguity through the corresponding CSI reporting configuration information. In accordance with the configured and activated SCell(s), CSI configuration information may be transferred to the configured and activated SCells through higher layer signaling of the corresponding SCell(s)

2) In case that CSI feedback configuration information of one or more DL Cells (or DL CCs) is transmitted in PCell (or PCC):

When PUCCH CSI feedback of each DL Cell (or DL CC) is configured in PCC, DL CC index [physical index, logical index or 3-bit CIF (Carrier Indication Field)] can also be notified in such a manner that the corresponding configuration can recognize which DL cell (or DL CC) is associated with the corresponding configuration. After the UE receives configuration information transmitted through higher layer signaling, it is determined which DL Cell (or DL CC) is associated with the corresponding configuration and can transmit PUCCH CSI feedback suitable for the determined configuration.

If PUCCH CSI feedback configurations of all DL CCs are transmitted in DL PCC without using DL CC index, the UE may have ambiguity in recognizing which DL CC is associated with the transmitted configuration.

If PUCCH CSI reporting configuration information of all DL CCs is transmitted in DL PCell without using DL Cell (or DL CC) index, the UE may have ambiguity in recognizing which DL Cell (or DL CC) is associated with the received CSI reporting configuration information. DL PCell and DL SCells may have different bandwidths (BWs), so that there may occur ambiguity in SB size k (Subband size k) or BP (Bandwidth Parts J) changeable with BW in consideration of only CSI reporting configuration information having no DL Cell (or DL CC) index. In order to solve such ambiguity, DL Cell (or DL CC) index may be transmitted along with CSI configuration information.

In addition, CSI reporting may be required not only for 'configured and activated SCells' but also for 'configured but deactivated SCells'. Accordingly, there is needed CSI feedback configuration information for deactivated SCells. The UE does not perform monitoring of the deactivated SCells, so that it cannot transmit CSI report configuration information through the corresponding SCell(s). Therefore, CSI configuration information of the deactivated SCell may be transmitted along with a cell (or CC) index via higher layer signaling on PCell.

In PCell, it may be possible to indicate CSI report configuration information of all DL Cells including PCell, and it may also be possible to indicate CSI report configuration information of PCell and deactivated SCells. In the latter case, CSI report configuration information of the activated SCell may be transmitted through the corresponding SCell.

When CSI report configuration information of all DL cells is transmitted in PCell, CSI configuration information for PCell may use 3GPP LTE methods without any change, and CSI configuration information of the remaining SCells may be transmitted in the form of delta (i.e., a difference value or offset) of PCell information.

3) In case that in which CSI reporting configuration information of one or more DL CCs (DL Cells) is transmitted in an arbitrary DL Cell (DL CC):

In this case, CSI configuration information element (IE) may be assigned to DL Cell (or DL CC) configuration IE. In other words, a CSI feedback configuration message can be transmitted in an arbitrary DL Cell irrespective of DL PCell and SCell. In this case, an arbitrary DL Cell may be composed of one or more DL Cells. Similarly to the second method (2), DL Cell (or DL CC) index is contained in the CSI configuration IE, so that it can be recognized which DL Cell includes DL CC configuration information and CSI configuration information using the DL CC index.

When CSI report configuration information of one or more DL cells is transmitted using an arbitrary DL Cell, CSI configuration information of the PCell or CSI configuration information of the self-scheduling CC may use 3GPP LTE method without any change, and configuration information of the remaining DL cell(s) may be transmitted in the form of delta.

Figure 34:
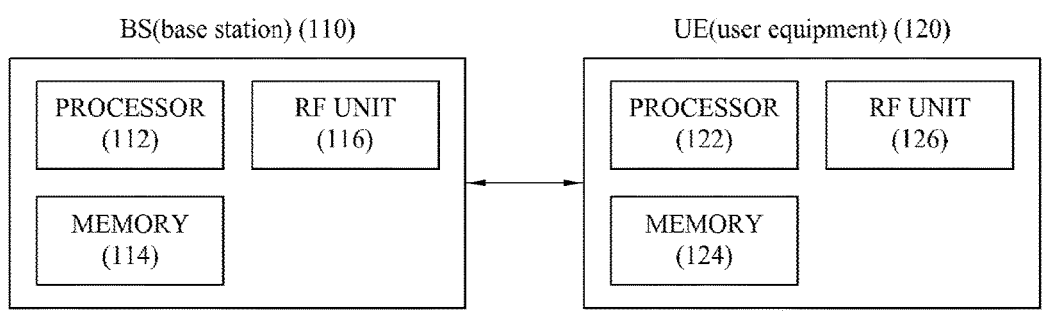
FIG. 34 is a block diagram illustrating a base station (BS) and a user equipment (UE) applicable to embodiments of the present invention.

FIG. 34 is a block diagram illustrating a base station (BS) and a user equipment (UE) applicable to embodiments of the present invention. If a relay or a relay node (RN) is contained in a wireless communication system, communication of a backhaul link is achieved between the BS and the RN, and communication of an access link is achieved between the RN and the UE. Therefore, the term 'BS' or 'UE' may be replaced with a relay or a relay node (RN) according to a situation.

Referring to FIG. 34, the wireless communication system includes a base station (BS) 110 and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the eNB (or BS) as the case may be. In other words, it will be apparent that various operations performed for communication with the UE in the network which includes a plurality of network nodes along with the eNB (or BS) can be performed by the BS or network nodes other than the eNB (or BS). The term eNB (or BS) may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are within the scope of the invention.

INDUSTRIAL APPLICABILITY

Exemplary embodiments of the present invention can be applied to a user equipment (UE), a base station (BS), and other devices. In more detail, the present invention can be applied to a method and apparatus for transmitting uplink control information.

The invention claimed is:

1. A method of transmitting a channel state information (CSI) report by a user equipment (UE) in a wireless communication system, the method comprising:
   receiving a plurality of periodic CSI report configurations for a primary cell (PCell) and one or more secondary cells (SCells); and
   transmitting, on a physical uplink control channel (PUCCH) of the PCell, one periodic CSI report among periodic CSI reports configured to be reported in a same subframe according to the plurality of periodic CSI report configurations,
   wherein in a first case where a periodic CSI report with a subband (SB) channel quality indicator (CQI) and a periodic CSI report with a wideband (WB) CQI collide in the same subframe:
      the UE transmits the periodic CSI report with the WB CQI as the only periodic CSI report,
      the periodic CSI report with the WB CQI has higher priority than the periodic CSI report with the SB CQI, even when the SB CQI is obtained from the PCell and the WB CQI is obtained from an SCell, and
      the periodic CSI report with the SB CQI has lower priority and is dropped by the UE.

2. The method of claim 1, wherein in a second case where a periodic CSI report with a rank indicator (RI) and either the periodic CSI report with the SB CQI or the WB CQI collide in the same subframe, the periodic CSI report with the SB CQI or the WB CQI has lower priority and is dropped by the UE.

3. The method of claim 2, further wherein, in the second case,
   the UE transmits the periodic CSI report with the RI as the only periodic CSI report, and the periodic CSI report with the RI has higher priority over the periodic CSI report with the SB CQI or the WB CSI, even when the WB CQI or the SB CQI is obtained from the PCell and the RI is obtained from an SCell.

4. The method of claim 1, wherein in a third case where a periodic CSI report with a rank indicator (RI) of the PCell and a periodic CSI report with an RI of an SCell collide in the same subframe, the periodic CSI report with the RI of the SCell has lower priority and is dropped by the UE.

5. The method of claim 4, wherein in a fourth case where the periodic CSI report with the RI of the SCell and a periodic CSI report with an RI of another SCell collide in the same subframe, the UE determines one periodic CSI report to transmit according to cell indices of the SCell and the another SCell.

6. The method of claim 5, further wherein, in the fourth case,
   the UE drops a corresponding CSI report including an RI of a higher indexed SCell among the SCell and the another SCell.

7. The method of claim 1, wherein each of the plurality of periodic CSI report configurations includes information on a reporting period.

8. A non-transitory computer readable medium recorded thereon a program for executing the method of claim 1.

9. A user equipment (UE) comprising:
   a receiver;
   a transmitter; and
   a processor, operatively coupled to the receiver and the transmitter, wherein the processor is configured to:
   control the receiver to receive a plurality of periodic channel state information (CSI) report configurations for a primary cell (PCell) and one or more secondary cells (SCells), and
   control the transmitter to transmit, through on a physical uplink control channel (PUCCH) of the PCell, one periodic CSI report among periodic CSI reports configured to be reported in a same subframe according to the plurality of periodic CSI report configurations,
   wherein in a first case where a periodic CSI report with a subband (SB) channel quality indicator (CQI) and a periodic CSI report with a wideband (WB) CQI collide in the same subframe:
      the processor controls the transmitter to transmit the periodic CSI report with the WB CQI as the only periodic CSI report,
      the periodic CSI report with the WB CQI has higher priority over the periodic CSI report with the SB CQI, even when the SB CQI is obtained from the PCell and the WB CQI is obtained from an SCell, and
      the periodic CSI report with the SB CQI has lower priority and is dropped by the processor.

10. The UE of claim 9, wherein in a second case where a periodic CSI report with a rank indicator (RI) and either the periodic CSI report with the SB CQI or the WB CQI collide in the same subframe, the periodic CSI report with the SB CQI or the WB CQI has lower priority and is dropped by the processor.

11. The UE of claim 10, further wherein, in the second case,
   the processor controls the transmitter to transmit the periodic CSI report with the RI as the only periodic CSI report, and the periodic CSI report with the RI has higher priority over the periodic CSI report with the SB CQI or the WB CSI, even when the WB CQI or the SB CQI is obtained from the PCell and the RI is obtained from an SCell.

12. The UE of claim 9, wherein in a third case where a periodic CSI report with a rank indicator (RI) of the PCell and a periodic CSI report with an RI of an SCell collide in the same subframe, the periodic CSI report with the RI of the SCell has lower priority and is dropped by the processor.

13. The UE of claim 12, wherein in a fourth case where the periodic CSI report with the RI of the SCell and a periodic CSI report with an RI of another SCell collide in the same subframe, the processor determines one periodic CSI report to transmit according to cell indices of the SCell and the another SCell.

14. The UE of claim 13, further wherein, in the fourth case,
 the processor drops a corresponding CSI report including an RI of a higher indexed SCell among the SCell and the another SCell.

15. The UE of claim 9, wherein each of the plurality of periodic CSI report configurations includes information on a reporting period.

\* \* \* \* \*